(12) United States Patent
Kanai et al.

(10) Patent No.: US 12,231,172 B2
(45) Date of Patent: Feb. 18, 2025

(54) OPTICAL SIGNAL PROCESSING APPARATUS AND OPTICAL SIGNAL PROCESSING METHOD

(71) Applicant: NIPPON TELEGRAPH AND TELEPHONE CORPORATION, Tokyo (JP)

(72) Inventors: Takuya Kanai, Musashino (JP); Shin Kaneko, Musashino (JP); Kazuaki Honda, Musashino (JP); Junichi Kani, Musashino (JP); Hiroo Suzuki, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 169 days.

(21) Appl. No.: 17/921,253

(22) PCT Filed: May 1, 2020

(86) PCT No.: PCT/JP2020/018382
§ 371 (c)(1),
(2) Date: Oct. 25, 2022

(87) PCT Pub. No.: WO2021/220503
PCT Pub. Date: Nov. 4, 2021

(65) Prior Publication Data
US 2023/0163856 A1    May 25, 2023

(51) Int. Cl.
*H04B 10/02* (2006.01)
*H04B 10/077* (2013.01)
*H04B 10/60* (2013.01)

(52) U.S. Cl.
CPC .......... *H04B 10/60* (2013.01); *H04B 10/077* (2013.01)

(58) Field of Classification Search
CPC ............. H04B 10/077; H04B 10/0795; H04B 10/0797; H04B 10/0793; H04B 10/40;
(Continued)

(56) References Cited

U.S. PATENT DOCUMENTS 6,331,792 B1    12/2001  Tonietto
6,909,853 B1 *   6/2005  Yamashita ........... H04B 10/077
                                                      398/31
(Continued)

FOREIGN PATENT DOCUMENTS

JP    10-229384 A    8/1998
JP   2001-077792 A   3/2001
(Continued)

OTHER PUBLICATIONS

K. Honda et al., "WDM Passive Optical Network Managed with Embedded Pilot Tone for Mobile Fronthaul", ECOC2015, We.3.4.4, 2015.
(Continued)

*Primary Examiner* — Hanh Phan

(57) ABSTRACT

An optical signal processing apparatus includes a removal unit and a superimposition unit. The removal unit receives, from a first optical transmission path, an optical signal converted from an electrical signal, in which a first signal and a second signal having different frequencies from each other have been superimposed, and removes the second signal from the optical signal which has been input. The superimposition unit superimposes a third signal having a frequency different from a frequency of the first signal on the optical signal in which the second signal has been removed by the removal unit, and outputs the optical signal in which the third signal has been superimposed to a second optical transmission path.

7 Claims, 18 Drawing Sheets

(58) Field of Classification Search
CPC ............. H04B 10/2507; H04B 10/541; H04B 10/516; H04B 10/532; H04B 10/60; H04J 14/02; H04J 14/0212
USPC ........ 398/33, 38, 30, 31, 32, 25, 26, 27, 79, 398/82, 83, 158, 159, 202, 208, 135, 136, 398/177, 181, 183, 186, 188, 198, 173, 398/175, 176, 178, 179, 180
See application file for complete search history.

(56) References Cited

U.S. PATENT DOCUMENTS

| | | | |
|---|---|---|---|
| 7,519,300 B2 * | 4/2009 | Ohtani | H04B 10/0793 398/6 |
| 2006/0110162 A1 | 5/2006 | Tian et al. | |
| 2013/0071104 A1 * | 3/2013 | Nakashima | H04J 14/0212 398/3 |
| 2016/0285582 A1 | 9/2016 | Kato et al. | |

FOREIGN PATENT DOCUMENTS

| | | |
|---|---|---|
| JP | 2006-148922 A | 6/2006 |
| JP | 2006197489 A | 7/2006 |
| JP | 2013070123 A | 4/2013 |
| JP | 2016-184896 A | 10/2016 |
| WO | WO-2017/104075 A1 | 6/2017 |

OTHER PUBLICATIONS

Goji Nakagawa et al., "Development of evaluation platform of AMCC superimposition on CPRI signal transmission for mobile fronthaul network", 2017 European Conference on Optical Communication (ECOC), Sep. 2017.

Goji Nakagawa et al., "Compact and low cost superimposition of AMCC with magneto-optic VOA", 2017 Optical Fiber Communications Conference and Exhibition(OFC), Mar. 2017.

K. Sato et al., "Reduction of Mode Partition Noise by Using Semiconductor Optical Amplifiers", IEEE Journal of Selected Topics in Quantum Electronics, vol. 7, No. 2, pp. 328-333, 2001.

* cited by examiner

OPTICAL SIGNAL PROCESSING APPARATUS AND OPTICAL SIGNAL PROCESSING METHOD

CROSS-REFERENCE TO RELATED APPLICATIONS

This application is a 371 U.S. National Phase of International Application No. PCT/JP2020/018382, filed on May 1, 2020. The entire disclosure of the above application is incorporated herein by reference.

TECHNICAL FIELD

The present invention relates to an optical signal processing apparatus and an optical signal processing method.

BACKGROUND ART

In the conventional optical communication, a user terminal superimposes a main signal and a control signal on one another in the form of an electrical signal, converts the superimposed electrical signal to an optical signal, and thereafter transmits the optical signal (see, for example, Non-Patent Literature 1).

FIG. 18 illustrates a configuration example of the conventional optical communication system. In the optical communication system illustrated in FIG. 18, a user terminal #1 and a user terminal #2 are connected by an optical fiber. An optical transceiver (TRx) #i installed in a user terminal #i (i=1, 2) communicates with an optical transceiver (TRx) #j installed in a counterpart user terminal #j (j=1, 2 and j≠i) by using an optical signal. During the communication, the user terminal #i superimposes a control signal $C_i$ on a main signal $M_i$ in which user data has been set, and transmits/receives the superimposed signal. For example, the control signal $C_i$ is an alive monitoring signal, a signal including state information, a wavelength control signal, control signals other than the wavelength control signal, or the like. The state information indicates, for example, the wavelength, power, temperature, or the like of the TRx #i. The wavelength control signal provides instructions about the initial settings of the wavelength, wavelength offset calibration, wavelength switching, or the like. The control signals other than the wavelength control signal are, for example, an on/off control signal for a TRx, a bit-rate control signal, or the like. The wavelength to be used for communication between TRx #1 and TRx #2 is set in advance in the user terminal #1 and the user terminal #2. There is also a case where one user terminal instructs the other user terminal about which wavelength to be used, such as a case where the user terminal #1 instructs the user terminal #2 about the wavelength.

The user terminal #i (i=1, 2) on the transmitting side superimposes the main signal $M_i$ and the control signal $C_i$ on one another in the form of an electrical signal. The TRx #i converts a superimposed electrical signal $E_i$ to an optical signal $G_i$, and outputs the optical signal $G_i$ to an optical fiber. The TRx #j in the user terminal #j (j=1, 2 and j≠i) on the receiving side receives an input of the optical signal $G_i$ transmitted through the optical fiber, and converts the optical signal $G_i$ to the electrical signal $E_i$ by using a photo diode (PD) or other diodes. The user terminal #j separates the converted electrical signal $E_i$ into the main signal $M_i$ and the control signal $C_i$, and handles the main signal $M_i$ and the control signal $C_i$ as separate electrical signals. In the user terminal #i on the transmitting side, a main signal and a control signal are carried on different frequency carriers in an electricity field as with the auxiliary management and control channel (AMCC), so that the main signal and the control signal can be handled as physically separate signals.

CITATION LIST

Non-Patent Literature

Non-Patent Literature 1: K. Honda et al., "WDM Passive Optical Network Managed with Embedded Pilot Tone for Mobile Fronthaul," 2015 European Conference on Optical Communication (ECOC), We.3.4.4

SUMMARY OF THE INVENTION

Technical Problem

As described above, a user terminal on the transmitting side superimposes a main signal and a control signal in the form of an electrical signal on one another, and thereafter converts the superimposed signal to an optical signal and transmits the optical signal. Due to this operation, the user terminal cannot rewrite the control signal somewhere along a communication path between the user terminal and another user terminal.

The present invention is made in view of the above circumstances, and it is an object of the present invention to provide an optical signal processing apparatus and an optical signal processing method to allow a signal superimposed on an optical signal to be partially replaced with a different signal somewhere along a communication path.

Means for Solving the Problem

One aspect of the present invention is an optical signal processing apparatus including: a removal unit that receives, from a first optical transmission path, an optical signal converted from an electrical signal, in which a first signal and a second signal having different frequencies from each other have been superimposed, and removes the second signal from the optical signal which has been input; and a superimposition unit that superimposes a third signal having a frequency different from a frequency of the first signal on the optical signal in which the second signal has been removed by the removal unit, and outputs the optical signal in which the third signal has been superimposed to a second optical transmission path.

Another aspect of the present invention is an optical signal processing method including: a removing step of receiving, from a first optical transmission path, an optical signal converted from an electrical signal, in which a first signal and a second signal having different frequencies from each other have been superimposed, and removing the second signal from the optical signal which has been input; and a superimposing step of superimposing a third signal having a frequency different from a frequency of the first signal on the optical signal in which the second signal has been removed in the removing step, and outputting the optical signal in which the third signal has been superimposed to a second optical transmission path.

Effects of the Invention

The present invention makes it possible to replace a part of a signal superimposed on an optical signal with a different signal somewhere along a communication path.

DESCRIPTION OF EMBODIMENTS

Figure 1:
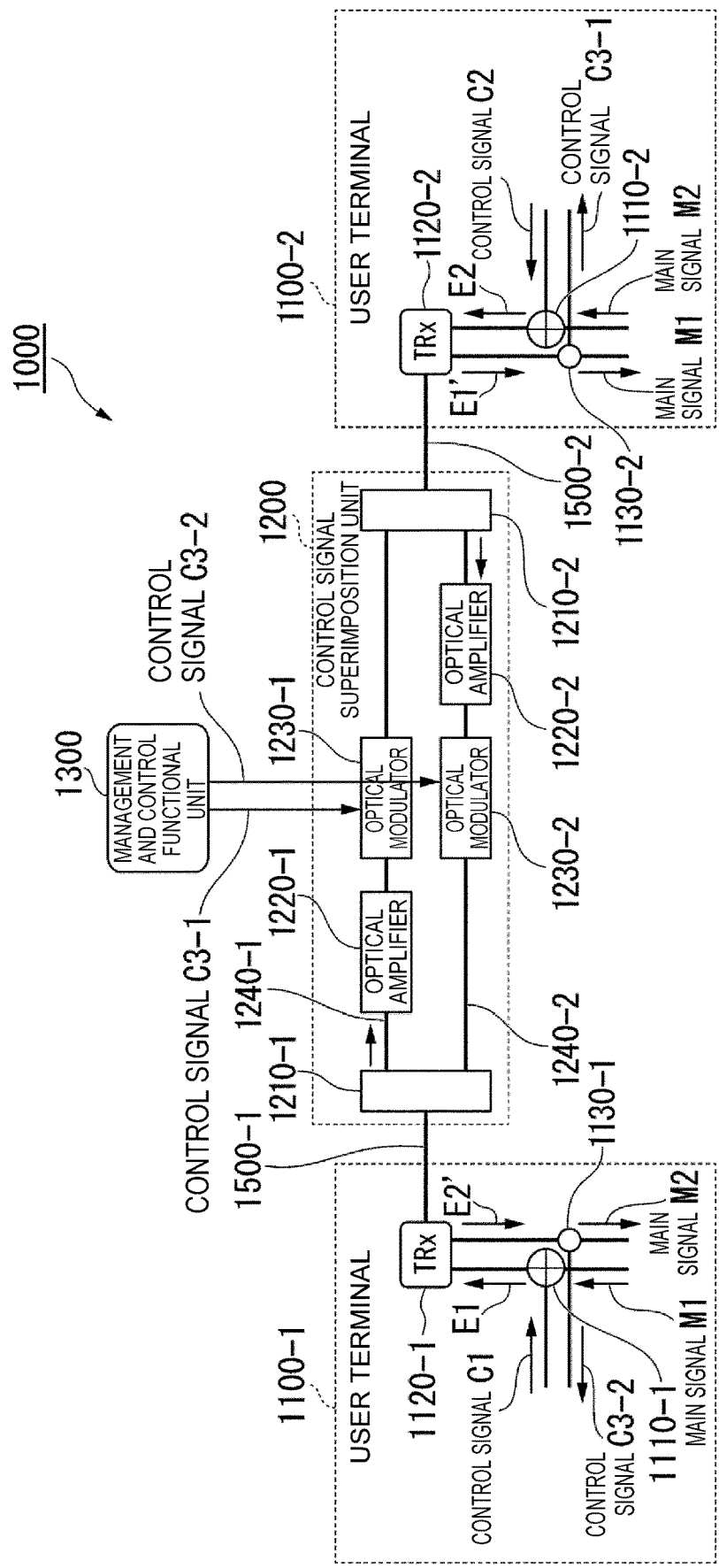
FIG. 1 is a diagram illustrating the configuration of an optical communication system according to a first embodiment of the present invention.

Hereinafter, embodiments of the present invention will be described in detail with reference to the drawings. Note that in a plurality of drawings, like component are denoted by like reference numerals, and therefore explanations thereof are omitted.

First Embodiment

FIG. 1 is a diagram illustrating the configuration of an optical communication system 1000 according to a first embodiment. The optical communication system 1000 includes a user terminal 1100, a control signal superimposition unit (superimposer) 1200, and a management and control functional unit 1300. The user terminal 1100 is connected to the control signal superimposition unit 1200 by an optical fiber 1500.

As the user terminal 1100, an optical communication apparatus configured to transmit/receive an optical signal according to the conventional technique can be used. The user terminal 1100 includes a signal mixer 1110, an optical transceiver (TRx) 1120, and a signal divider 1130. The signal mixer 1110 outputs, to the TRx 1120, a transmission signal in which a main signal and a control signal that are both electrical signals have been superimposed on one another. The control signal has a lower frequency than the frequency of the main signal. For example, as the control signal, the AMCC is used. The TRx 1120 converts the transmission signal from an electrical signal to an optical signal, and outputs the optical signal to the optical fiber 1500. The TRx 1120 receives an input of an optical signal transmitted through the optical fiber 1500, and converts the input optical signal to an electrical signal to output the electrical signal. The signal divider 1130 separates the electrical signal output by the TRx 1120 into the main signal and the control signal based on their respective frequencies.

Hereinafter, two units of user terminals 1100, each of which is a counterpart of the other, are described as "user terminal 1100-1" and "user terminal 1100-2," and the signal mixer 1110, the TRx 1120, and the signal divider 1130 included in a user terminal 1100-$i$ ($i=1$, 2) are described as "signal mixer 1110-$i$," "TRx 1120-$i$," and "signal divider 1130-$i$," respectively. The optical fiber 1500 between the user terminal 1100-$i$ and the control signal superimposition unit 1200 is described as "optical fiber 1500-$i$." The main signal and the control signal to be transmitted by the user terminal 1100-$i$ are described as "main signal Mi" and "control signal Ci," respectively. Similarly to the conventional technique, the control signal Ci is, for example, an alive monitoring signal, a signal including state information (the wavelength, power, temperature, or the like of the TRx 1120-$i$), a wavelength control signal, control signals other than the wavelength control signal, or the like.

The control signal superimposition unit 1200 includes transmission-reception separation devices 1210-1 and 1210-2, optical amplifiers 1220-1 and 1220-2, and optical modulators 1230-1 and 1230-2. The transmission-reception separation devices 1210-1 and 1210-2 are connected by optical fibers 1240-1 and 1240-2. On an optical fiber 1240-$i$ ($i=1$, 2), an optical amplifier 1220-$i$ and an optical modulator 1230-$i$ are provided.

The transmission-reception separation device 1210-$i$ ($i=1$, 2) receives an input of an optical signal output by the user terminal 1100-$i$ from the optical fiber 1500-$i$, and outputs the optical signal to the optical amplifier 1220-$i$. The transmission-reception separation device 1210-$i$ receives an input of an optical signal output by the optical modulator 1230-$j$ ($j=1$, 2 and $j \neq i$), and outputs the optical signal to the optical fiber 1500-$i$.

Each of the optical amplifiers 1220-1 and 1220-2 has the characteristics of high-pass filter, and removes a low-frequency signal. Each of the optical amplifiers 1220-1 and 1220-2 is, for example, a semiconductor optical amplifier (SOA). The optical amplifier 1220-$i$ ($i=1$, 2) receives an input of an optical signal output by the transmission-reception separation device 1210-$i$. The optical amplifier 1220-$i$ removes a control signal superimposed on the low-frequency side of the input optical signal, and outputs the optical signal with the control signal removed to the optical modulator 1230-$i$. Note that according to the transmittance characteristics of the optical amplifier 1220-$i$ serving as a high-pass filter, a frequency that can be sufficiently attenuated in the optical amplifier 1220-$i$ is selected as a carrier frequency of the control signal. The transmittance characteristics of the optical amplifier 1220-$i$ serving as a high-pass filter will be described later with reference to FIG. 5.

Each of the optical modulators 1230-1 and 1230-2 is a lithium-niobate (LiNbO$_3$ (LN)) modulator, an electro-absorption (EA) modulator, or other types of modulators. The optical modulator 1230-$i$ ($i=1, 2$) receives an input of an optical signal as the main signal from the optical amplifier 1220-$i$, and superimposes a control signal on the low-frequency side of the input optical signal. The optical modulator 1230-$i$ outputs the optical signal with the control signal superimposed thereon to the transmission-reception separation device 1210-$j$ ($j=1, 2$ and $j \neq i$).

The management and control functional unit 1300 manages and controls the optical communication system 1000. The management and control functional unit 1300 outputs a control signal to be superimposed on a main signal to the control signal superimposition unit 1200. A control signal to be superimposed on the main signal Mi ($i=1, 2$) is described as "control signal C3-$i$."

Figure 2:
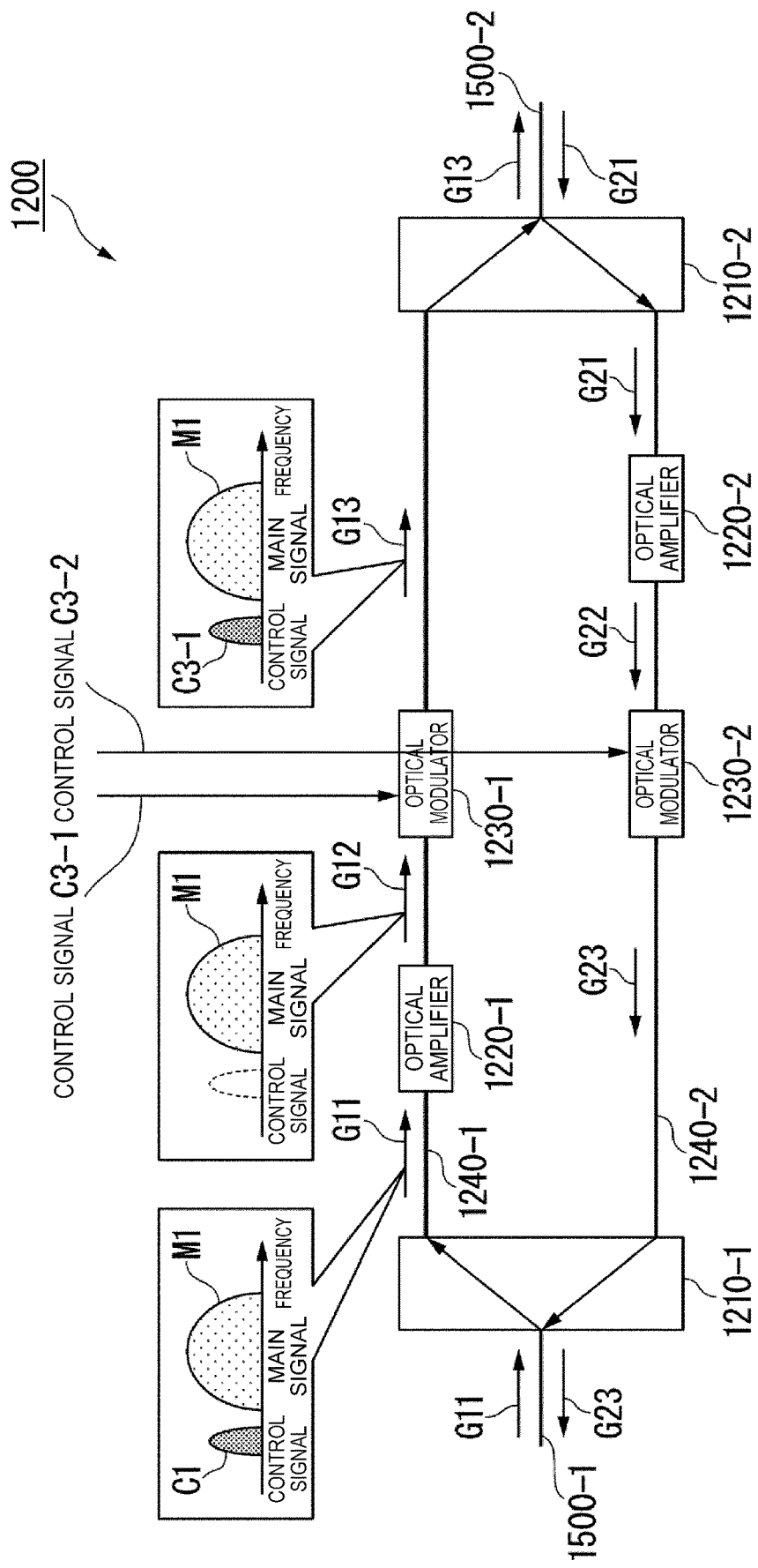
FIG. 2 is a diagram for explaining the processing in a control signal superimposition unit according to the first embodiment.

FIG. 2 is a diagram for explaining the processing in the control signal superimposition unit 1200. A signal mixer 1110-1 in the user terminal 1100-1 illustrated in FIG. 1 outputs the electrical signal E1 in which the main signal M1 and the control signal C1 in the form of an electrical signal have been superimposed on one another. A TRx 1120-1 converts the electrical signal E1 to an optical signal G11, and outputs the optical signal G11 to an optical fiber 1500-1.

The transmission-reception separation device 1210-1 receives an input of the optical signal G11 transmitted through the optical fiber 1500-1, and outputs the optical signal G11 to the optical amplifier 1220-1. The optical amplifier 1220-1 generates an optical signal G12 with the control signal C1 on the low-frequency side removed from the input optical signal G11, and outputs the optical signal G12 to the optical modulator 1230-1. The optical modulator 1230-1 superimposes the control signal C3-1, input from the management and control functional unit 1300, on the low-frequency side of the optical signal G12 to generate an optical signal G13, and outputs the optical signal G13 to the transmission-reception separation device 1210-2. The transmission-reception separation device 1210-2 outputs the optical signal G13 to an optical fiber 1500-2. A TRx 1120-2 in the user terminal 1100-2 illustrated in FIG. 1 receives an input of the optical signal G13 transmitted through the optical fiber 1500-2, and converts the optical signal G13 to an electrical signal E1'. A signal divider 1130-2 separates the converted electrical signal E1' into the main signal M1 and the control signal C3-1.

A signal mixer 1110-2 in the user terminal 1100-2 illustrated in FIG. 1 outputs an electrical signal E2 in which a main signal M2 and a control signal C2 in the form of an electrical signal have been superimposed on one another. The TRx 1120-2 converts the superimposed electrical signal E2 to an optical signal G21, and outputs the optical signal G21 to the optical fiber 1500-2.

The transmission-reception separation device 1210-2 receives an input of the optical signal G21 transmitted through the optical fiber 1500-2, and outputs the optical signal G21 to the optical amplifier 1220-2. The optical amplifier 1220-2 generates an optical signal G22 with the control signal C2 on the low-frequency side removed from the input optical signal G21, and outputs the optical signal G22 to the optical modulator 1230-2. The optical modulator 1230-2 superimposes a control signal C3-2, input from the management and control functional unit 1300, on the low-frequency side of the optical signal G22 to generate an optical signal G23, and outputs the optical signal G23 to the transmission-reception separation device 1210-1. The transmission-reception separation device 1210-1 outputs the optical signal G23 to the optical fiber 1500-1. The TRx 1120-1 in the user terminal 1100-1 illustrated in FIG. 1 receives an input of the optical signal G23 transmitted through the optical fiber 1500-1, and converts the optical signal G23 to an electrical signal E2'. A signal divider 1130-1 separates the converted electrical signal E2' into the main signal M2 and the control signal C3-2.

Note that a signal to be superimposed in the control signal superimposition unit 1200 uses the same frequency as a control signal to be transmitted by the user terminal 1100. At this time, a pilot tone with a frequency different from, and within a lower frequency range than, the frequency of the main signal may be used as a carrier, or a control signal remaining as a baseband signal may be superimposed. It is allowable that a control signal to be superimposed in the control signal superimposition unit 1200 uses a pilot tone within a higher frequency range than the frequency of the main signal as a carrier, provided that the control signal is separable from the main signal in the user terminal 1100.

If the management and control functional unit 1300 does not superimpose a control signal on an optical signal transmitted from the user terminal 1100-1 and addressed to the user terminal 1100-2, then the control signal superimposition unit 1200 may not be provided with the optical amplifier 1220-1 and the optical modulator 1230-1. If the management and control functional unit 1300 does not superimpose a control signal on an optical signal transmitted from the user terminal 1100-2 and addressed to the user terminal 1100-1, then the control signal superimposition unit 1200 may not be provided with the optical amplifier 1220-2 and the optical modulator 1230-2.

Figure 3:
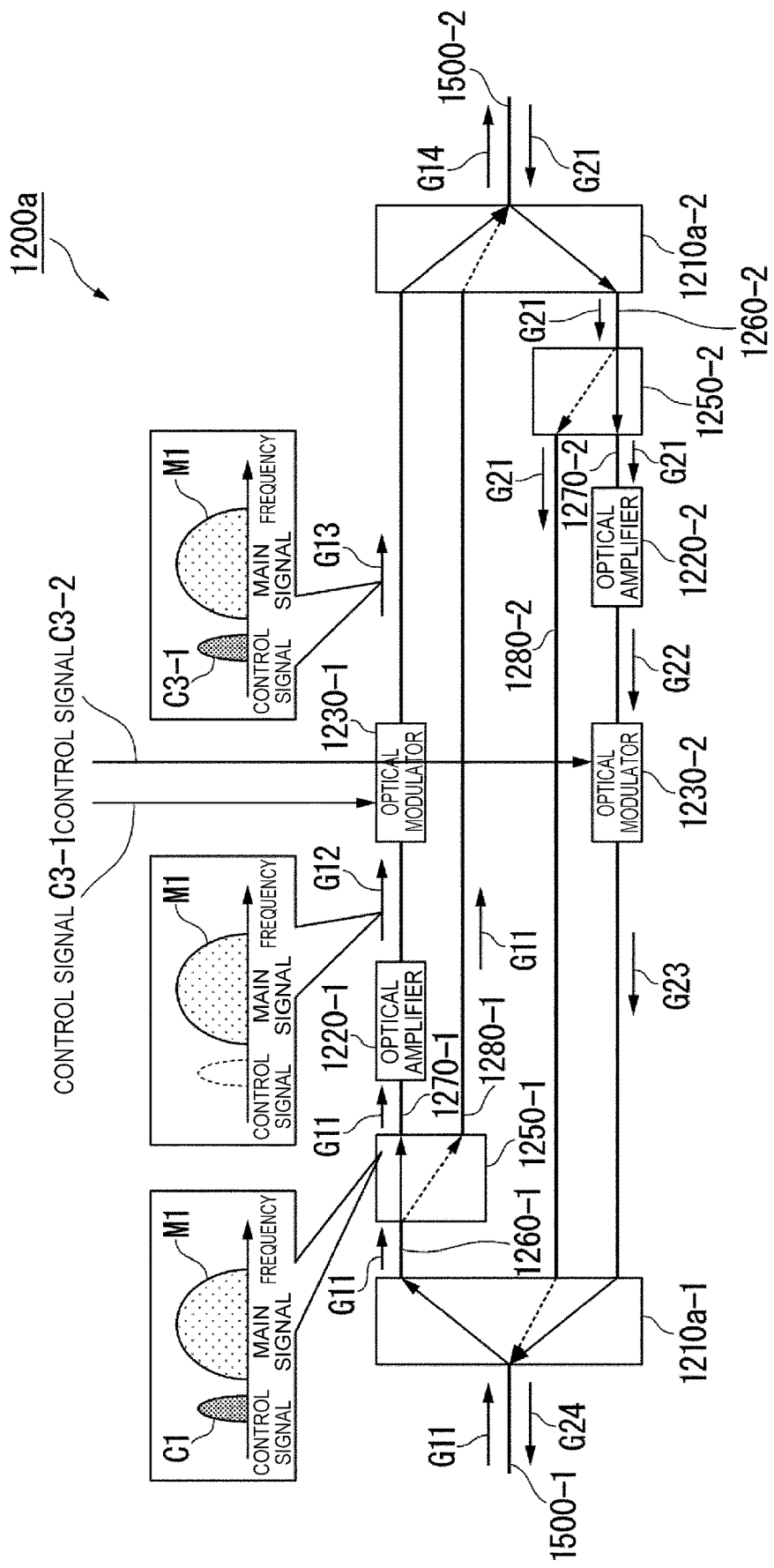
FIG. 3 is a diagram illustrating the configuration of the control signal superimposition unit according to the first embodiment.
Figure 4:
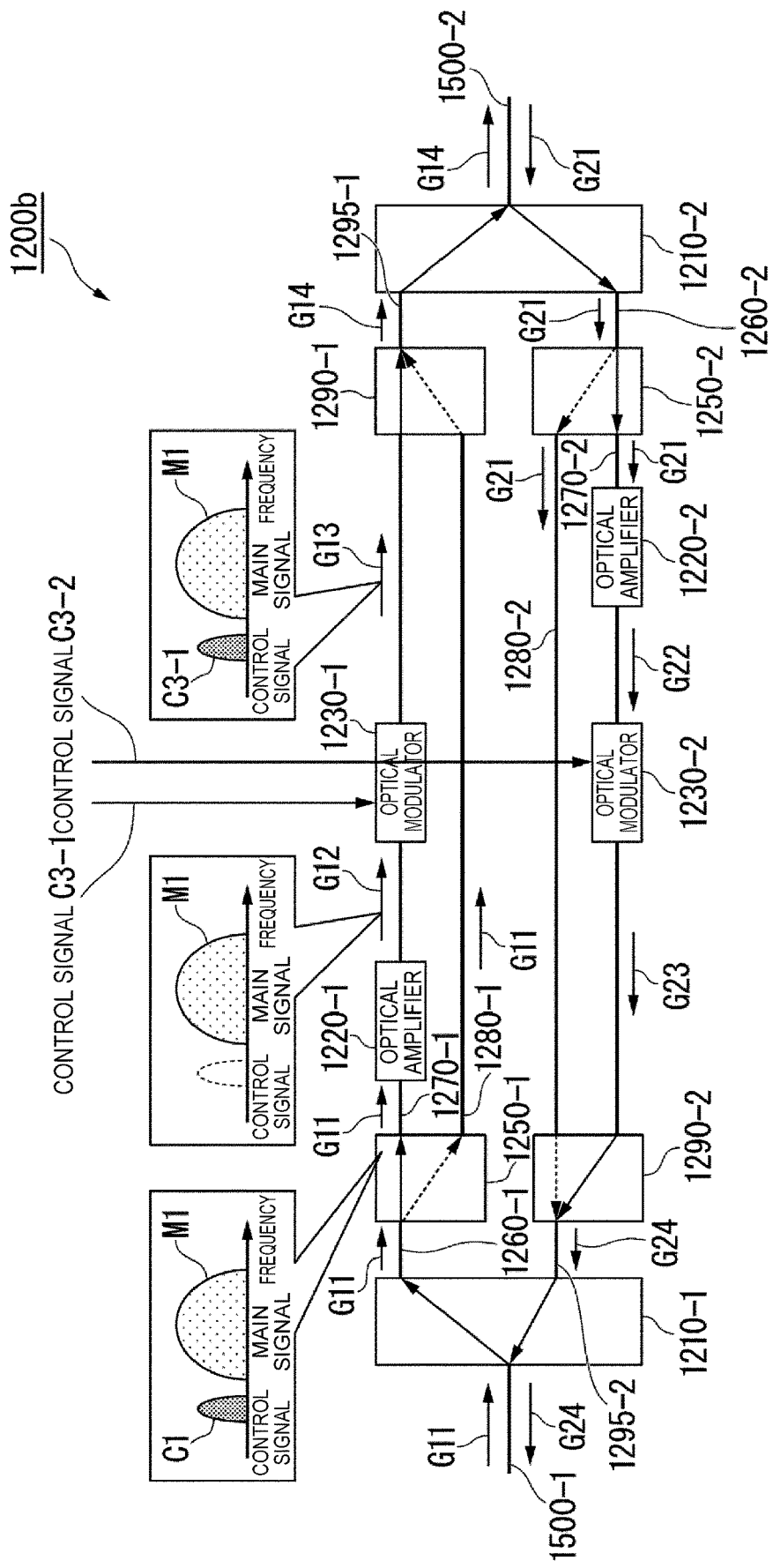
FIG. 4 is a diagram illustrating the configuration of the control signal superimposition unit according to the first embodiment.

The optical communication system 1000 may be provided with a control signal superimposition unit 1200$a$ illustrated in FIG. 3 or a control signal superimposition unit 1200$b$ illustrated in FIG. 4, instead of the control signal superimposition unit 1200 illustrated in FIG. 1.

FIG. 3 is a diagram illustrating the configuration of the control signal superimposition unit 1200$a$. The control signal superimposition unit 1200$a$ includes transmission-reception separation devices 1210$a$-1 and 1210$a$-2, optical switches (SW) 1250-1 and 1250-2, the optical amplifiers 1220-1 and 1220-2, and the optical modulators 1230-1 and 1230-2.

The transmission-reception separation device 1210$a$-1 and the optical SW 1250-1 are connected by an optical fiber 1260-1. The transmission-reception separation device 1210$a$-1 and the optical SW 1250-2 are connected by optical fibers 1270-2 and 1280-2. The transmission-reception separation device 1210$a$-2 and the optical SW 1250-2 are connected by an optical fiber 1260-2. The transmission-reception separation device 1210$a$-2 and the optical SW 1250-1 are connected by optical fibers 1270-1 and 1280-1. Each of the optical fibers 1270-1 and 1270-2 is a line on which a control signal is superimposed. Each of the optical fibers 1280-1 and 1280-2 is a line on which a control signal is not superimposed. On the optical fiber 1270-$i$ ($i=1, 2$), the optical amplifier 1220-$i$ and the optical modulator 1230-$i$ are provided.

The transmission-reception separation device 1210a-i (i=1, 2) receives an input of an optical signal transmitted through the optical fiber 1500-i, and outputs the input optical signal to an optical SW 1250-i. The transmission-reception separation device 1210a-i receives an input of an optical signal transmitted through an optical fiber 1270-j (j=1, 2 and j≠i) or through an optical fiber 1280-j, and outputs the input optical signal to the optical fiber 1500-i.

The optical SW 1250-i (i=1, 2) includes one input port and two output ports. The input port of the optical SW 1250-i is connected to an optical fiber 1260-i. The two output ports are connected individually to the optical fibers 1270-i and 1280-i. The optical SW 1250-i outputs an optical signal input from the input port to either of the output ports.

Operation of the control signal superimposition unit 1200a is described below. The transmission-reception separation device 1210a-1 receives an input of the optical signal G11 with the main signal M1 and the control signal C1 superimposed on one another from the optical fiber 1500-1, and outputs the optical signal G11 to the optical SW 1250-1. The optical SW 1250-1 outputs the optical signal G11, which is a target from which a control signal is removed, to the optical amplifier 1220-1, or outputs the optical signal G11, from which a control signal is not removed, to the transmission-reception separation device 1210a-2.

The optical amplifier 1220-1 receives an input of the optical signal G11 from the optical SW 1250-1, and outputs the optical signal G12 with the control signal C1 on the low-frequency side removed from the optical signal G11. The optical modulator 1230-1 outputs the optical signal G13 in which the control signal C3-1 input from the management and control functional unit 1300 has been superimposed on the low-frequency side of the optical signal G12. The transmission-reception separation device 1210-2 outputs an optical signal G14, which is the optical signal G13 input from the optical modulator 1230-1 or the optical signal G11 input from the optical SW 1250-1, to the optical fiber 1500-2. The TRx 1120-2 in the user terminal 1100-2 illustrated in FIG. 1 converts the optical signal G14 to an electrical signal, and the signal divider 1130-2 separates the converted electrical signal into the main signal M1 and the control signal C1 or the control signal C3-1.

The transmission-reception separation device 1210a-2 receives an input of the optical signal G21 with the main signal M2 and the control signal C2 superimposed on one another from the optical fiber 1500-2, and outputs the optical signal G21 to the optical SW 1250-2. The optical SW 1250-2 outputs the optical signal G21, which is a target from which a control signal is removed, to the optical amplifier 1220-2, or outputs the optical signal G21, from which a control signal is not removed, to the transmission-reception separation device 1210a-1.

The optical amplifier 1220-2 receives an input of the optical signal G21 from the optical SW 1250-2, and outputs the optical signal G22 with the control signal C2 on the low-frequency side removed from the optical signal G21. The optical modulator 1230-2 outputs the optical signal G23 in which the control signal C3-2 input from the management and control functional unit 1300 has been superimposed on the low-frequency side of the optical signal G22. The transmission-reception separation device 1210a-1 outputs an optical signal G24, which is the optical signal G23 input from the optical modulator 1230-2 or the optical signal G21 input from the optical SW 1250-2, to the optical fiber 1500-1. The TRx 1120-1 in the user terminal 1100-1 illustrated in FIG. 1 converts the optical signal G24 to an electrical signal, and the signal divider 1130-2 separates the converted electrical signal into the main signal M1 and the control signal C2 or the control signal C3-2.

FIG. 4 is a diagram illustrating the configuration of the control signal superimposition unit 1200b. The control signal superimposition unit 1200b is different from the control signal superimposition unit 1200a illustrated in FIG. 3 in that the transmission-reception separation devices 1210-1 and 1210-2 illustrated in FIG. 1 are provided instead of the transmission-reception separation devices 1210a-1 and 1210a-2, and further optical SWs 1290-1 and 1290-2 are provided.

An optical SW 1290-i (i=1, 2) includes two input ports and one output port. The optical SW 1290-i is connected to the optical modulator 1230-i by the optical fiber 1270-i, connected to the optical SW 1250-i by the optical fiber 1280-i, and connected to the transmission-reception separation device 1210-j (j=1, 2 and j≠i) by an optical fiber 1295-i.

The optical SW 1290-1 outputs the optical signal G13 transmitted through the optical fiber 1270-1, or the optical signal G11 transmitted through the optical fiber 1280-1 to an optical fiber 1295-1 as the optical signal G14. The transmission-reception separation device 1210-2 receives an input of the optical signal G14 transmitted through the optical fiber 1295-1, and outputs the input optical signal G14 to the optical fiber 1500-2. The optical SW 1290-2 outputs the optical signal G24, which is the optical signal G23 transmitted through the optical fiber 1270-2 or the optical signal G21 transmitted through the optical fiber 1280-2 to an optical fiber 1295-2. The transmission-reception separation device 1210-1 receives an input of the optical signal G24 transmitted through the optical fiber 1295-2, and outputs the input optical signal G24 to the optical fiber 1500-1. Note that in the control signal superimposition unit 1200b, each of the optical SWs 1290-1 and 1290-2 may be replaced with an optical coupler.

Figure 5:
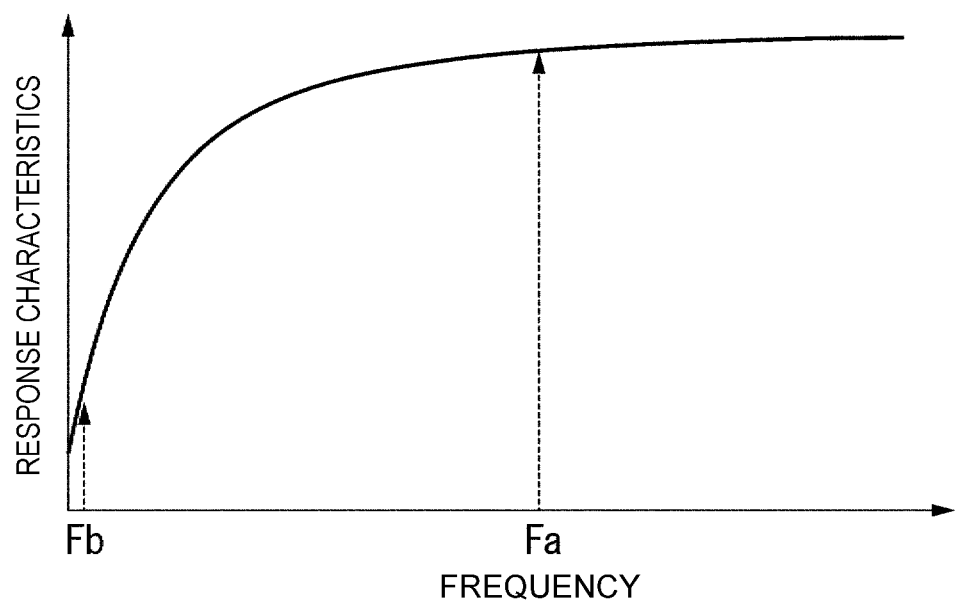
FIG. 5 is a graph illustrating response characteristics of an optical amplifier according to the first embodiment.

FIG. 5 is a graph illustrating response characteristics of the optical amplifiers 1220-1 and 1220-2. FIG. 5 illustrates the response characteristics of the optical amplifiers 1220-1 and 1220-2 when they are SOAs. The optical amplifiers 1220-1 and 1220-2 exhibit adequate response characteristics to a signal with a sufficiently high frequency equal to or higher than 10 GHz. In contrast, the response characteristics of the optical amplifiers 1220-1 and 1220-2 significantly deteriorate within the low frequency range equal or lower than several GHz. By taking advantage of these response characteristics, it is possible to remove a low-frequency signal. For example, a frequency Fa is set to the main signal, while a frequency Fb is set to the control signal, and this makes it possible to remove the control signal from an optical signal having passed through the optical amplifiers 1220-1 and 1220-2.

Note that since the differences in response characteristics depend on the gain of the SOA, the length of the SOA is increased, or the SOAs are connected in multiple stages, so that this makes it possible to increase the differences in response characteristics. Also, the differences in response characteristics depend on input power to the SOA. It is possible to increase the differences in response characteristics by increasing the output power of the TRx 1120 installed in the user terminal 1100 such that the input power to the SOA is increased. Note that the details and other information on the SOA characteristics are described in, for example, Reference Literature 1 "K. Sato et al., "Reduction of Mode Partition Noise by Using Semiconductor Optical Amplifiers," IEEE Journal of Selected Topics in Quantum Electronics, vol. 7, No. 2, pp. 328-333, 2001."

According to the present embodiment, the optical communication system includes the control signal superimposition unit 1200, 1200a, or 1200b, unlike the conventional optical communication system, so that even after connection between the user terminals 1100 has completed, the management and control functional unit 1300 can still transmit a control signal such as a wavelength management and control signal to the user terminals 1100.

Second Embodiment

An optical communication system according to the present embodiment superimposes a control signal that provides instructions about wavelength switching somewhere along a communication path between subscriber terminal, and switches the wavelength for the subscriber terminal to a different wavelength.

Figure 6:
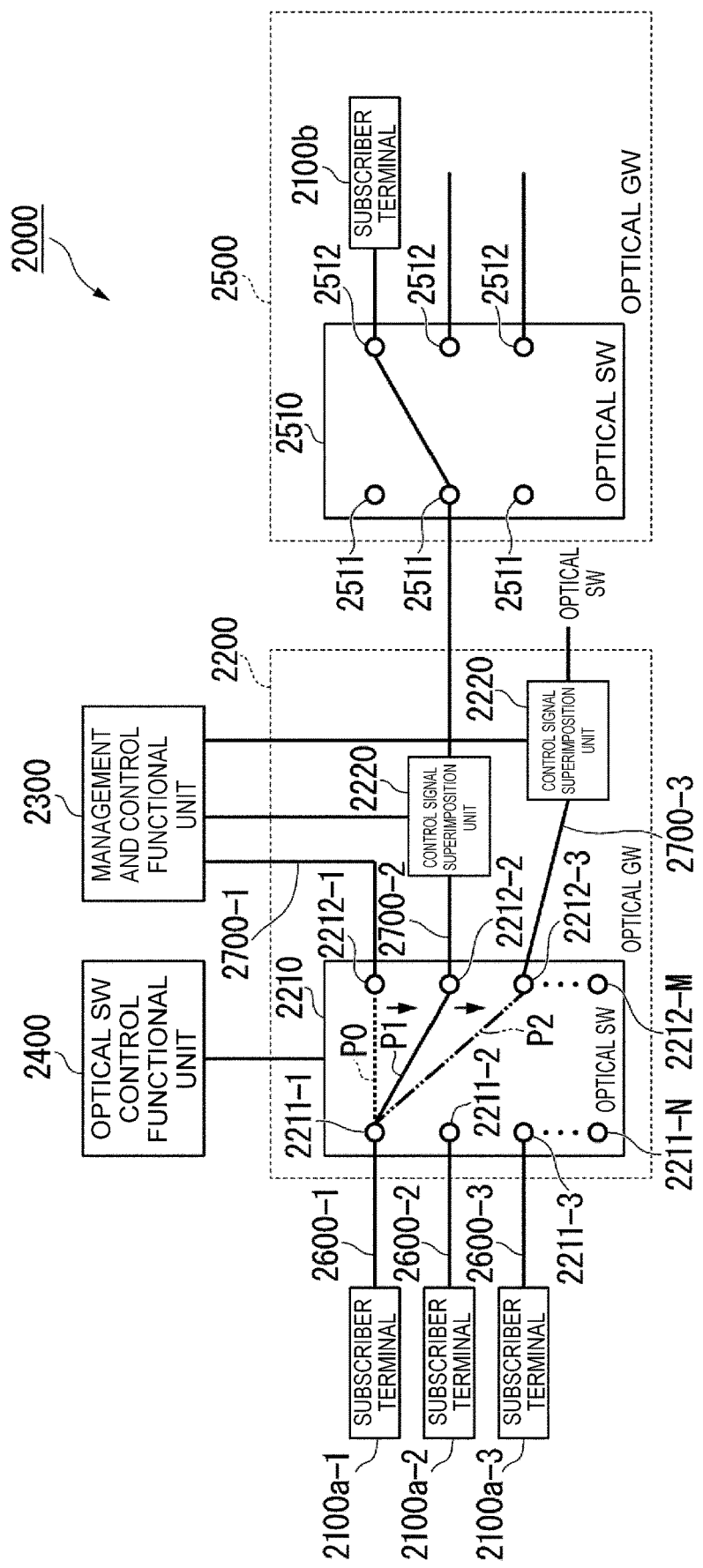
FIG. 6 is a diagram illustrating the configuration of an optical communication system according to a second embodiment.

FIG. 6 is a diagram illustrating the configuration of an optical communication system 2000 according to a second embodiment. The optical communication system 2000 includes a subscriber terminal 2100, an optical gateway (GW) 2200, a management and control functional unit 2300, an optical SW control functional unit 2400, and an optical GW 2500. The subscriber terminal 2100 is an optical communication apparatus according to the conventional technique. For example, the subscriber terminal 2100 is the user terminal 1100 of the first embodiment.

The optical GW 2200 includes an optical SW 2210 and one or more control signal superimposition units 2220. The optical SW 2210 includes N (N is an integer equal to or larger than 1) first ports 2211, and M (M is an integer equal to or larger than 2) second ports 2212. The N first ports 2211 are described as "first ports 2211-1 to 2211-N," respectively. The M second ports 2212 are described as "second ports 2212-1 to 2212-M," respectively.

The first port 2211 is connected to the subscriber terminal 2100 through an optical transmission path 2600. Hereinafter, the optical transmission path 2600 connected to a first port 2211-n (n is an integer equal to or larger than 1, and equal to or smaller than N) is described as "optical transmission path 2600-n." The subscriber terminal 2100 connected to the optical transmission path 2600-n is described as "subscriber terminal 2100a-n." Subscriber terminals 2100a-1 to 2100a-N are collectively referred to as "subscriber terminal 2100a," or are described as "subscriber terminal 2100a" when any of the subscriber terminals 2100a-1 to 2100a-N is not specified.

The second port 2212 is connected to an optical transmission path 2700. Hereinafter, the optical transmission path 2700 connected to a second port 2212-k (k is an integer equal to or larger than 1, and equal to or smaller than M) is described as "optical transmission path 2700-k." Some of the second ports 2212 are connected to the management and control functional unit 2300, while the other second ports 2212 are connected to an additional optical communication apparatus. In the present embodiment, the second port 2212-1 is connected to the management and control functional unit 2300 through an optical transmission path 2700-1, while the second port 2212-m (m is an integer equal to or larger than 2, and equal to or smaller than M) is connected to an additional optical communication apparatus such as an optical SW through an optical transmission path 2700-m.

The optical SW 2210 outputs an optical signal, input from any of the first ports 2211, through the second port 2212 corresponding to the destination of this optical signal. The optical SW 2210 outputs an optical signal, input from any of the second ports 2212, through the first port 2211 corresponding to the subscriber terminal 2100a as the destination of this optical signal.

The control signal superimposition unit 2220 is provided on the optical transmission path 2700-m (m is an integer equal to or larger than 2, and equal to or smaller than M). On some of the optical transmission paths 2700-2 to 2700-M, the control signal superimposition unit 2220 may not be provided. The control signal superimposition unit 2220 superimposes a control signal, output by the management and control functional unit 2300, on one or both of an optical signal whose transmission source is the subscriber terminal 2100a and an optical signal addressed to the subscriber terminal 2100a.

As the control signal superimposition unit 2220, the control signal superimposition unit 1200 of the first embodiment illustrated in FIGS. 1 and 2 is used. In the control signal superimposition unit 2220, the transmission-reception separation device 1210-1 (FIGS. 1 and 2) is connected to the optical transmission path 2700 between the transmission-reception separation device 1210-1 and the optical SW 2210, instead of being connected to the optical fiber 1500-1, while the transmission-reception separation device 1210-2 (FIGS. 1 and 2) is connected to the optical transmission path 2700 between the transmission-reception separation device 1210-2 and an optical SW different from the optical SW 2210, instead of being connected to the optical fiber 1500-2. If the management and control functional unit 2300 does not superimpose a control signal on an optical signal transmitted from the subscriber terminal 2100a, then the control signal superimposition unit 1200 that does not include the optical amplifier 1220-1 and the optical modulator 1230-1 may be used as the control signal superimposition unit 2220. If the management and control functional unit 2300 does not superimpose a control signal on an optical signal addressed to the subscriber terminal 2100a, then the control signal superimposition unit 1200 that does not include the optical amplifier 1220-2 and the optical modulator 1230-2 may be used as the control signal superimposition unit 2220. Alternatively, as the control signal superimposition unit 2220, the control signal superimposition unit 1200a illustrated in FIG. 3 or the control signal superimposition unit 1200b illustrated in FIG. 4 may be used.

The management and control functional unit 2300 sets the wavelength to the subscriber terminal 2100 connected to the management and control functional unit 2300 through the optical SW 2210. The management and control functional unit 2300 switches the path for the subscriber terminal 2100a to a different path in the optical SW 2210, and thereafter outputs a control signal to be superimposed on an optical signal to the control signal superimposition unit 2220. Examples of the control signal include a wavelength control signal, an on/off control signal for a TRx, and a bit-rate control signal. The wavelength control signal is a signal that provides instructions about the initial settings of the wavelength, wavelength offset calibration, wavelength switching, or the like. Note that the control signal is not limited to those signals described above. The optical SW control functional unit 2400 sets a path between the first port 2211 and the second port 2212 of the optical SW 2210.

The optical GW 2500 includes an optical SW 2510. The optical SW 2510 includes one or more first ports 2511, and one or more second ports 2512. The optical SW 2510 outputs an optical signal, input from any of the first ports 2511, through the second port 2512 corresponding to the destination of this optical signal. The optical SW 2510 outputs an optical signal, input from any of the second ports

2512, through the first port 2511 corresponding to the destination of this optical signal. The second port 2512 is connected to the subscriber terminal 2100 or an additional optical SW. The subscriber terminal 2100 connected to the optical GW 2500 is described as "subscriber terminal 2100*b*." The subscriber terminal 2100*b* may be located inside the optical GW 2500, or may be located outside the optical GW 2500. In addition, the optical GW 2500 may be of an identical configuration to the optical GW 2200.

Operation of the optical communication system 2000 at the time of newly connecting the subscriber terminal 2100*a*-1 to a network is described below. First, the subscriber terminal 2100*a*-1 is connected to the management and control functional unit 2300 by a path P0 through the optical SW 2210. For example, the subscriber terminal 2100*a*-1 uses a wavelength $\lambda 11$ for transmission, while using a wavelength $\lambda 12$ for reception. The management and control functional unit 2300 transmits a control signal to the subscriber terminal 2100*a*-1 to instruct the subscriber terminal 2100*a*-1 to set the wavelength corresponding to a communication destination. For example, the communication destination is represented as a service to be utilized, or as a user at the communication destination. In this example, the communication destination for the subscriber terminal 2100*a*-1 is the subscriber terminal 2100*b*, and the subscriber terminal 2100*a*-1 sets a wavelength $\lambda 21$ for transmission, while setting a wavelength $\lambda 22$ for reception. In accordance with the timing of wavelength switching operation performed by the subscriber terminal 2100*a*-1, the optical SW control functional unit 2400 switches the path P0 between the first port 2211-1 and the second port 2212-1 in the optical SW 2210 to a path P1 between the first port 2211-1 and the second port 2212-2. Upon this switching, the subscriber terminal 2100*a*-1 starts communicating with the subscriber terminal 2100*b* that is a desired connection destination for the subscriber terminal 2100*a*-1.

When the subscriber terminal 2100*a*-1 connects to an additional connection destination during communication with the subscriber terminal 2100*b*, it is necessary to set a wavelength to be used for the subscriber terminal 2100*a*-1. Thus, the management and control functional unit 2300 outputs a control signal that instructs the subscriber terminal 2100*a*-1 to change the wavelength to a different wavelength to the control signal superimposition unit 2220 on the optical transmission path 2700-2. The control signal superimposition unit 2220 removes a control signal from an optical signal transmitted from the subscriber terminal 2100*b* and addressed to the subscriber terminal 2100*a*-1, and superimposes the control signal, output by the management and control functional unit 2300, on the optical signal. According to the control signal superimposed on the received optical signal, the subscriber terminal 2100*a*-1 sets a wavelength $\lambda 31$ for transmission, while setting a wavelength $\lambda 32$ for reception.

The management and control functional unit 2300 outputs a control signal that instructs the subscriber terminal 2100*b* to change the wavelength or stop transmission at this wavelength, to the control signal superimposition unit 2220 on the optical transmission path 2700-2. The control signal superimposition unit 2220 removes a control signal from an optical signal transmitted from the subscriber terminal 2100*a*-1 and addressed to the subscriber terminal 2100*b*, and superimposes the control signal, output by the management and control functional unit 2300, on the optical signal. According to the control signal superimposed on the received optical signal, the subscriber terminal 2100*b* changes the wavelength or stops transmission at this wavelength.

In accordance with the timing of wavelength switching operation performed by the subscriber terminal 2100*a*-1, the optical SW control functional unit 2400 switches the path P1 to a path P2 between the first port 2211-1 and the second port 2212-3 in the optical SW 2210. Upon this switching, the subscriber terminal 2100*a*-1 starts communicating with a new communication destination. The control signal superimposition unit 2220 that superimposes a control signal on an optical signal to be transmitted/received by the subscriber terminal 2100*a*-1 switches from the control signal superimposition unit 2220 on the optical transmission path 2700-2 to the control signal superimposition unit 2220 on the optical transmission path 2700-3.

Note that a splitter may be provided in the control signal superimposition unit 1200, which is used as the control signal superimposition unit 2220, between the transmission-reception separation device 1210-1 and the optical amplifier 1220-1 and between the transmission-reception separation device 1210-2 and the optical amplifier 1220-2, or a splitter may be provided in the control signal superimposition unit 1200*a*, which is used as the control signal superimposition unit 2220, between the transmission-reception separation device 1210*a*-1 and the optical SW 1250-1 and between the transmission-reception separation device 1210*a*-2 and the optical SW 1250-2, or a splitter may be provided in the control signal superimposition unit 1200*b*, which is used as the control signal superimposition unit 2220, between the transmission-reception separation device 1210-1 and the optical SW 1250-1 and between the transmission-reception separation device 1210-2 and the optical SW 1250-2, such that the splitter may be used to split a part of an optical signal, and output it to the management and control functional unit 2300. The management and control functional unit 2300 monitors a control signal set in the part of the split optical signal.

In a case where the subscriber terminal 2100 is connected by using a passive optical network (PON), even when the communication destination is changed, the same path and the same wavelength may still be used continuously, or different wavelengths may be used on the same path. In the above descriptions, the control signal provides instructions about wavelength switching, however, the control signal is not limited thereto.

In the present embodiment, the control signal superimposition unit 2220 is provided, so that even after the subscriber terminal 2100 has completed connection with its desired connection destination, the management and control functional unit 2300 can still transmit a wavelength management and control signal.

Figure 7:
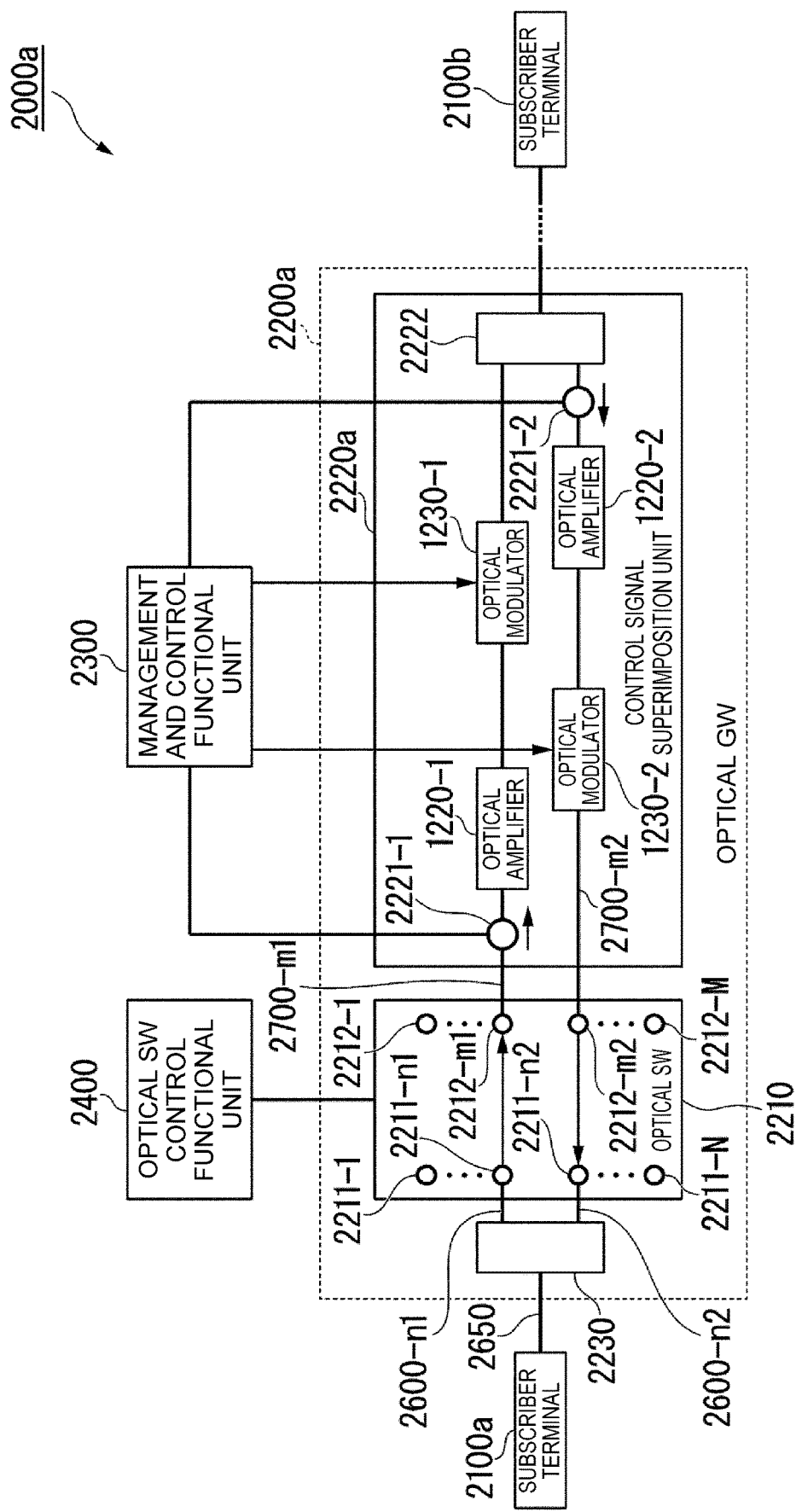
FIG. 7 is a diagram illustrating the configuration of the optical communication system according to the second embodiment.

Note that an optical SW may use different ports for transmission to and for reception from a single unit of subscriber terminal 2100*a*. FIG. 7 is a diagram illustrating the configuration of an optical communication system 2000*a* when an optical SW uses different ports for transmission to and for reception from a single unit of subscriber terminal 2100*a*. The optical communication system 2000*a* illustrated in FIG. 7 is different from the optical communication system 2000 illustrated in FIG. 6 in that an optical GW 2200*a* is provided instead of the optical GW 2200, and the subscriber terminal 2100*a* is connected to an optical transmission path 2650 instead of the optical transmission path 2600. While FIG. 7 only illustrates a single unit of subscriber terminal 2100*a*, a plurality of units of subscriber terminals 2100*a* can possibly be connected to the optical GW 2200*a*.

The optical GW 2200a includes a transmission-reception separation device 2230, the optical SW 2210, and a control signal superimposition unit 2220a. While FIG. 7 illustrates only a single control signal superimposition unit 2220a, the optical GW 2200a can possibly include a plurality of control signal superimposition units 2220a. The transmission-reception separation device 2230 is connected to the optical transmission path 2650, and also connected to an optical transmission path 2600-$n1$ ($n1$ is an integer equal to or larger than 1, and equal to or smaller than N), and an optical transmission path 2600-$n2$ ($n2 \neq n1$, and $n2$ is an integer equal to or larger than 2, and equal to or smaller than N). The transmission-reception separation device 2230 receives an input of an optical signal transmitted by the subscriber terminal 2100a from the optical transmission path 2650, and outputs the input optical signal to the first port 2211-$n1$ of the optical SW 2210. The transmission-reception separation device 2230 outputs the optical signal, output from the first port 2211-$n2$ of the optical SW 2210, to the optical transmission path 2650.

The optical SW 2210 receives an input of an optical signal, whose transmission source is the subscriber terminal 2100a, from the first port 2211-$n1$, and outputs the input optical signal from the second port 2212-$m1$ ($m1$ is an integer equal to or larger than 3, and equal to or smaller than M). The optical SW 2210 receives an input of an optical signal addressed to the subscriber terminal 2100a from the second port 2212-$m2$ ($m2 \neq m1$, and $m2$ is an integer equal to or larger than 3, and equal to or smaller than M), and outputs the input optical signal from the first port 2211-$n2$. Note that although not illustrated in FIG. 7, the second ports 2212-1 and 2212-2 of the optical SW 2210 are connected to the management and control functional unit 2300. The second port 2212-1 outputs a signal addressed to the management and control functional unit 2300 from the subscriber terminal 2100a. The second port 2212-2 receives an input of a signal transmitted from the management and control functional unit 2300 and addressed to the subscriber terminal 2100a.

The control signal superimposition unit 2220a is connected to the second port 2212-$m1$ of the optical SW 2210 by the optical transmission path 2700-$m1$, while being connected to the second port 2212-$m2$ of the optical SW 2210 by the optical transmission path 2700-$m2$. The control signal superimposition unit 2220a includes splitters 2221-1 and 2221-2, the optical amplifiers 1220-1 and 1220-2, the optical modulators 1230-1 and 1230-2, and a transmission-reception separation device 2222. The splitter 2221-1, the optical amplifier 1220-1, and the optical modulator 1230-1 are provided on the optical transmission path 2700-$m1$. The splitter 2221-2, the optical amplifier 1220-2, and the optical modulator 1230-2 are provided on the optical transmission path 2700-$m2$. The transmission-reception separation device 2222 is connected to the optical transmission paths 2700-$m1$ and 2700-$m2$, and also connected to an optical fiber between the transmission-reception separation device 2222 and an additional optical SW.

The splitter 2221-1 receives an input of an optical signal output by the optical SW 2210, and splits the input optical signal into parts. The splitter 2221-1 outputs a part of the split optical signal to the management and control functional unit 2300, while outputting the remaining part of the split optical signal to the optical amplifier 1220-1. The splitter 2221-2 splits an optical signal input from the transmission-reception separation device 2222 into parts. The splitter 2221-2 outputs a part of the split optical signal to the management and control functional unit 2300, while outputting the remaining part of the split optical signal to the optical amplifier 1220-2. The transmission-reception separation device 2222 outputs a signal input from the optical transmission path 2700-$m1$ to an additional optical SW, and outputs a signal input from the optical fiber connected to the additional optical SW to the optical transmission path 2700-$m2$.

Operation of the optical communication system 2000a is described below. The transmission-reception separation device 2230 receives an input of an optical signal transmitted by the subscriber terminal 2100a, and outputs the input optical signal to the first port 2211-$n1$ of the optical SW 2210. The optical SW 2210 outputs an optical signal, input from the first port 2211-$n1$, through the second port 2212-$m1$ corresponding to the subscriber terminal 2100b as a destination of this optical signal. The splitter 2221-1 in the control signal superimposition unit 2220a splits an optical signal output from the second port 2212-$m1$ into parts. The splitter 2221-1 outputs a part of the split optical signal to the management and control functional unit 2300, while outputting the remaining part of the split optical signal to the optical amplifier 1220-1. The management and control functional unit 2300 monitors a control signal set in the part of the optical signal split by the splitter 2221-1.

The optical amplifier 1220-1 removes the control signal on the low-frequency side from the input optical signal, and outputs the optical signal to the optical modulator 1230-1. The optical modulator 1230-1 superimposes a control signal, input from the management and control functional unit 2300, on the optical signal input from the optical amplifier 1220-1, and outputs the superimposed signal to the transmission-reception separation device 2222. The transmission-reception separation device 2222 outputs a signal input from the optical modulator 1230-1 to an additional optical SW connected to the subscriber terminal 2100b.

The transmission-reception separation device 2222 receives an input of an optical signal transmitted by the subscriber terminal 2100b from the additional optical SW, and outputs the input optical signal to the optical transmission path 2700-$m2$. The splitter 2221-2 receives an input of the optical signal output by the transmission-reception separation device 2222, and splits the input optical signal into parts. The splitter 2221-2 outputs a part of the split optical signal to the management and control functional unit 2300, while outputting the remaining part of the split optical signal to the optical amplifier 1220-2. The management and control functional unit 2300 monitors a control signal set in the part of the optical signal split by the splitter 2221-2.

The optical amplifier 1220-2 removes the control signal on the low-frequency side from the input optical signal, and outputs the optical signal to the optical modulator 1230-2. The optical modulator 1230-2 superimposes a control signal, input from the management and control functional unit 2300, on the optical signal input from the optical amplifier 1220-2, and inputs the superimposed signal to the second port 2212-$m2$ of the optical SW 2210. The optical SW 2210 outputs the optical signal, input from the second port 2212-$m2$, through the first port 2211-$n2$ corresponding to the subscriber terminal 2100a as a destination of this optical signal. The transmission-reception separation device 2230 receives an input of the optical signal output from the first port 2211-$n2$, and outputs the input optical signal to the optical transmission path 2650 between the transmission-reception separation device 2230 and the subscriber terminal 2100a.

Note that if the management and control functional unit 2300 does not superimpose a control signal on an optical signal transmitted from the subscriber terminal 2100*a* and addressed to the subscriber terminal 2100*b*, then the control signal superimposition unit 2220*a* may not be provided with the optical amplifier 1220-1 and the optical modulator 1230-1. If the management and control functional unit 2300 does not superimpose a control signal on an optical signal transmitted from the subscriber terminal 2100*b* and addressed to the subscriber terminal 2100*a*, then the control signal superimposition unit 2220*a* may not be provided with the optical amplifier 1220-2 and the optical modulator 1230-2.

There is a case where the subscriber terminal 2100*b* is connected to an optical GW 2200*a* (described as "optical GW 2200*a*-2") different from the optical GW 2200*a* (described as "optical GW 2200*a*-1") connected to the subscriber terminal 2100*a*. In that case, the control signal superimposition unit 2220*a* in the optical GW 2200*a*-1 may not be provided with the optical amplifier 1220-2 and the optical modulator 1230-2, and simultaneously, the control signal superimposition unit 2220*a* in the optical GW 2200*a*-2 may not be provided with the optical amplifier 1220-2 and the optical modulator 1230-2. In this case, the control signal superimposition unit 2220*a* in the optical GW 2200*a*-1 superimposes a control signal for the subscriber terminal 2100*b* on an optical signal to be transmitted from the subscriber terminal 2100*a* to the subscriber terminal 2100*b*. In addition, the control signal superimposition unit 2220*a* in the optical GW 2200*a*-2 superimposes a control signal for the subscriber terminal 2100*a* on an optical signal to be transmitted from the subscriber terminal 2100*b* to the subscriber terminal 2100*a*.

Alternatively, the control signal superimposition unit 2220*a* in the optical GW 2200*a*-1 may not be provided with the optical amplifier 1220-1 and the optical modulator 1230-1, and simultaneously, the control signal superimposition unit 2220*a* in the optical GW 2200*a*-2 may not be provided with the optical amplifier 1220-1 and the optical modulator 1230-1. In this case, the control signal superimposition unit 2220*a* in the optical GW 2200*a*-2 superimposes a control signal for the subscriber terminal 2100*b* on an optical signal to be transmitted from the subscriber terminal 2100*a* to the subscriber terminal 2100*b*. In addition, the control signal superimposition unit 2220*a* in the optical GW 2200*a*-1 superimposes a control signal for the subscriber terminal 2100*a* on an optical signal to be transmitted from the subscriber terminal 2100*b* to the subscriber terminal 2100*a*.

According to the present embodiment, the optical communication system includes the control signal superimposition unit 2220 or 2220*a*, so that even after connection between the subscriber terminals 2100 has completed, the management and control functional unit 2300 can still transmit, to the subscriber terminals 2100, a control signal for controlling an item included in the state information, such as a wavelength management and control signal.

Third Embodiment

In the second embodiment, a control signal is superimposed at the subsequent stage to an optical SW. In the present embodiment, a control signal is superimposed at the previous stage to an optical SW.

Figure 8:
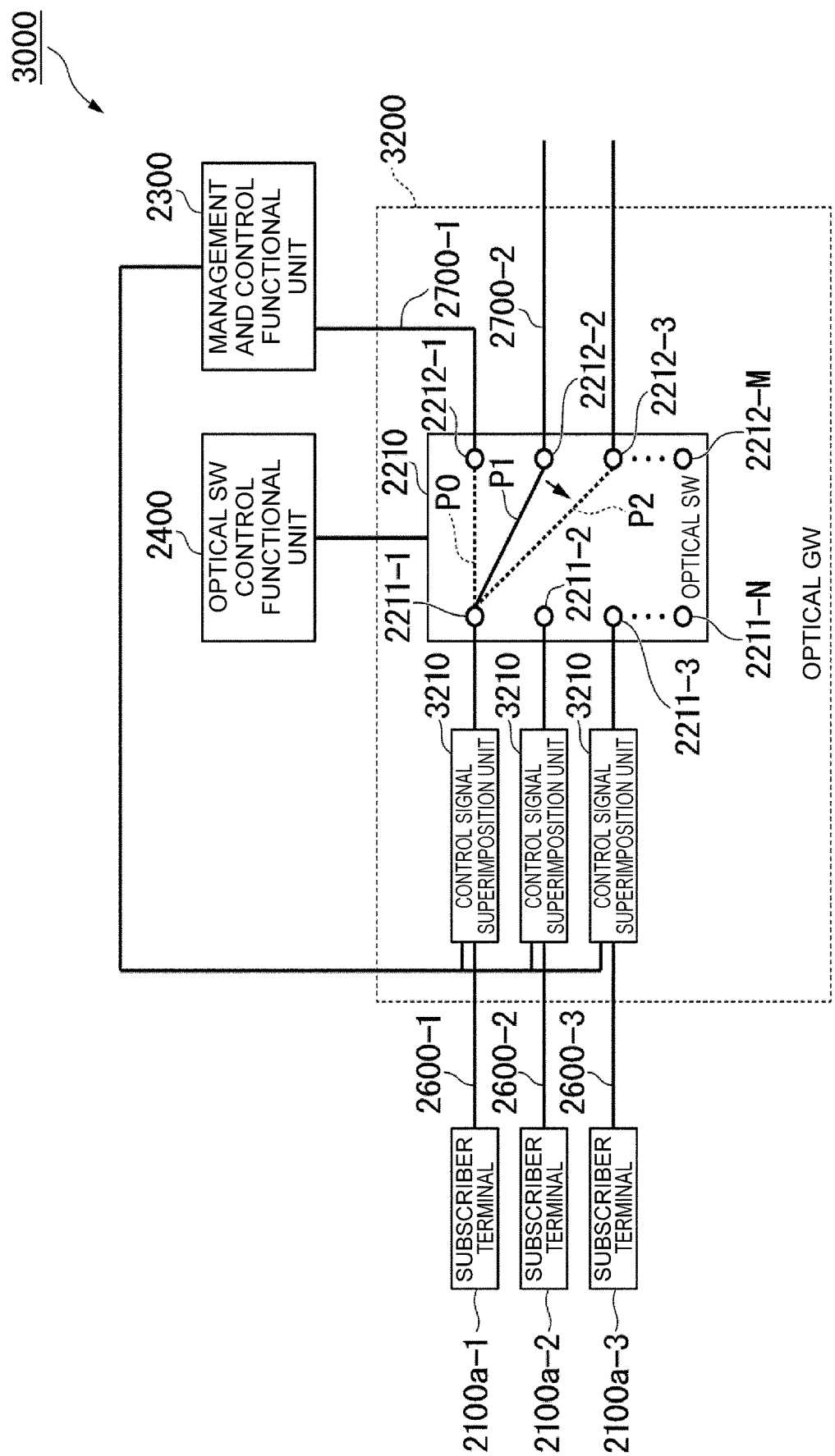
FIG. 8 is a diagram illustrating the configuration of an optical communication system according to a third embodiment.

FIG. 8 illustrates the configuration of an optical communication system 3000 of the present embodiment. The optical communication system 3000 is different from the optical communication system 2000 of the second embodiment illustrated in FIG. 6 in that an optical GW 3200 is provided instead of the optical GW 2200.

The optical GW 3200 includes a control signal superimposition unit 3210 and the optical SW 2210. The control signal superimposition unit 3210 is provided on the optical transmission path 2600-*n* between the subscriber terminal 2100*a*-*n* and the optical SW 2210. The control signal superimposition unit 3210 superimposes a control signal, output by the management and control functional unit 2300, on one or both of an optical signal transmitted by the subscriber terminal 2100*a*-*n* and an optical signal transmitted to the subscriber terminal 2100*a*-*n*.

As the control signal superimposition unit 3210, the control signal superimposition unit 1200 of the first embodiment illustrated in FIGS. 1 and 2 is used. In the control signal superimposition unit 3210, the transmission-reception separation device 1210-1 (FIGS. 1 and 2) is connected to the optical transmission path 2600 between the transmission-reception separation device 1210-1 and the subscriber terminal 2100*a*, instead of being connected to the optical fiber 1500-1, while the transmission-reception separation device 1210-2 (FIGS. 1 and 2) is connected to the optical transmission path 2600 between the transmission-reception separation device 1210-2 and the optical SW 2210. If the management and control functional unit 2300 does not superimpose a control signal on an optical signal transmitted from the subscriber terminal 2100*a*, then the control signal superimposition unit 1200 that does not include the optical amplifier 1220-1 and the optical modulator 1230-1 may be used as the control signal superimposition unit 3210. If the management and control functional unit 2300 does not superimpose a control signal on an optical signal addressed to the subscriber terminal 2100*a*, then the control signal superimposition unit 1200 that does not include the optical amplifier 1220-2 and the optical modulator 1230-2 may be used as the control signal superimposition unit 3210. Alternatively, as the control signal superimposition unit 3210, the control signal superimposition unit 1200*a* of the first embodiment illustrated in FIG. 3 or the control signal superimposition unit 1200*b* of the first embodiment illustrated in FIG. 4 may be used.

The optical communication system 3000 operates in the same manner as in the second embodiment at the time of performing the initial settings and wavelength switching on the subscriber terminal 2100*a*-1 to be newly connected to the network. That is, the subscriber terminal 2100*a*-1 is connected to the management and control functional unit 2300 by the path P0 between the first port 2211-1 and the second port 2212-1 through the optical SW 2210. The management and control functional unit 2300 outputs a control signal for the initial settings to the optical SW 2210 to instruct the optical SW 2210 to set the wavelength and other information corresponding to a communication destination. The optical SW 2210 transmits the control signal output by the management and control functional unit 2300 to the subscriber terminal 2100*a*-1 through the path P0. In accordance with the timing of wavelength switching operation performed by the subscriber terminal 2100*a*-1, the optical SW control functional unit 2400 switches the path P0 to the path P1 between the first port 2211-1 and the second port 2212-2. The subscriber terminal 2100*a*-1 performs the initial settings such as wavelength switching according to the received control signal, and thereafter starts communicating with its desired connection destination through the path P1.

When the subscriber terminal 2100*a*-1 connects to an additional connection destination during the communication using the path P1 in the optical SW 2210, the management and control functional unit 2300 outputs a control signal that instructs the control signal superimposition unit 3210 on the optical transmission path 2600-1 to change the wavelength to a different wavelength. The control signal superimposition unit 3210 removes a control signal from an optical signal output by the optical SW 2210 and addressed to the subscriber terminal 2100a-1, and superimposes the control signal, output by the management and control functional unit 2300, on the optical signal. According to the control signal superimposed on the received optical signal, the subscriber terminal 2100a-1 sets the wavelength to be used for transmission, and the wavelength to be used for reception.

The management and control functional unit 2300 outputs, to the control signal superimposition unit 3210 on the optical transmission path 2600-1, a control signal that instructs the subscriber terminal 2100 (not illustrated) as a communication destination for the subscriber terminal 2100a-1 to change the wavelength or stop transmission at this wavelength. The control signal superimposition unit 3210 removes a control signal from an optical signal transmitted from the subscriber terminal 2100a-1 and addressed to the subscriber terminal 2100 as a communication destination, and superimposes the control signal, output by the management and control functional unit 2300, on the optical signal. In accordance with the timing of wavelength switching operation performed by the subscriber terminal 2100a-1, the optical SW control functional unit 2400 switches the path P1 to the path P2 in the optical SW 2210. Upon this switching, the subscriber terminal 2100a-1 starts communicating with a new communication destination.

Note that in the optical communication system 3000, the control signal superimposition unit 3210 may superimpose a control signal for performing the initial settings on the subscriber terminal 2100a-1 to be newly connected to the network, and transmit the superimposed control signal. The subscriber terminal 2100a-1 is connected to the management and control functional unit 2300 by the path P0 through the optical SW 2210. The management and control functional unit 2300 outputs unmodulated light (or modulated light) to the optical SW 2210. The optical SW 2210 outputs the light output by the management and control functional unit 2300 through the path P0. Further, the management and control functional unit 2300 outputs, to the control signal superimposition unit 3210 on the optical transmission path 2600-1, a control signal for the initial settings to be transmitted to the subscriber terminal 2100a-1. The control signal superimposition unit 3210 on the optical transmission path 2600-1 superimposes the control signal input from the management and control functional unit 2300 on the light input from the optical SW 2210. The control signal superimposition unit 3210 outputs the optical signal with the control signal superimposed on the light. The subscriber terminal 2100a-1 receives the optical signal transmitted through the optical transmission path 2600-1, and performs the initial settings according to the control signal set in the received optical signal.

Note that a splitter may be provided in the control signal superimposition unit 1200, which is used as the control signal superimposition unit 3210, between the transmission-reception separation device 1210-1 and the optical amplifier 1220-1 and between the transmission-reception separation device 1210-2 and the optical amplifier 1220-2, or a splitter may be provided in the control signal superimposition unit 1200a, which is used as the control signal superimposition unit 3210, between the transmission-reception separation device 1210a-1 and the optical SW 1250-1 and between the transmission-reception separation device 1210a-2 and the optical SW 1250-2, or a splitter may be provided in the control signal superimposition unit 1200b, which is used as the control signal superimposition unit 3210, between the transmission-reception separation device 1210-1 and the optical SW 1250-1 and between the transmission-reception separation device 1210-2 and the optical SW 1250-2, such that the splitter may be used to split a part of an optical signal, and output it to the management and control functional unit 2300. The management and control functional unit 2300 monitors a control signal set in the part of the split optical signal.

Figure 9:
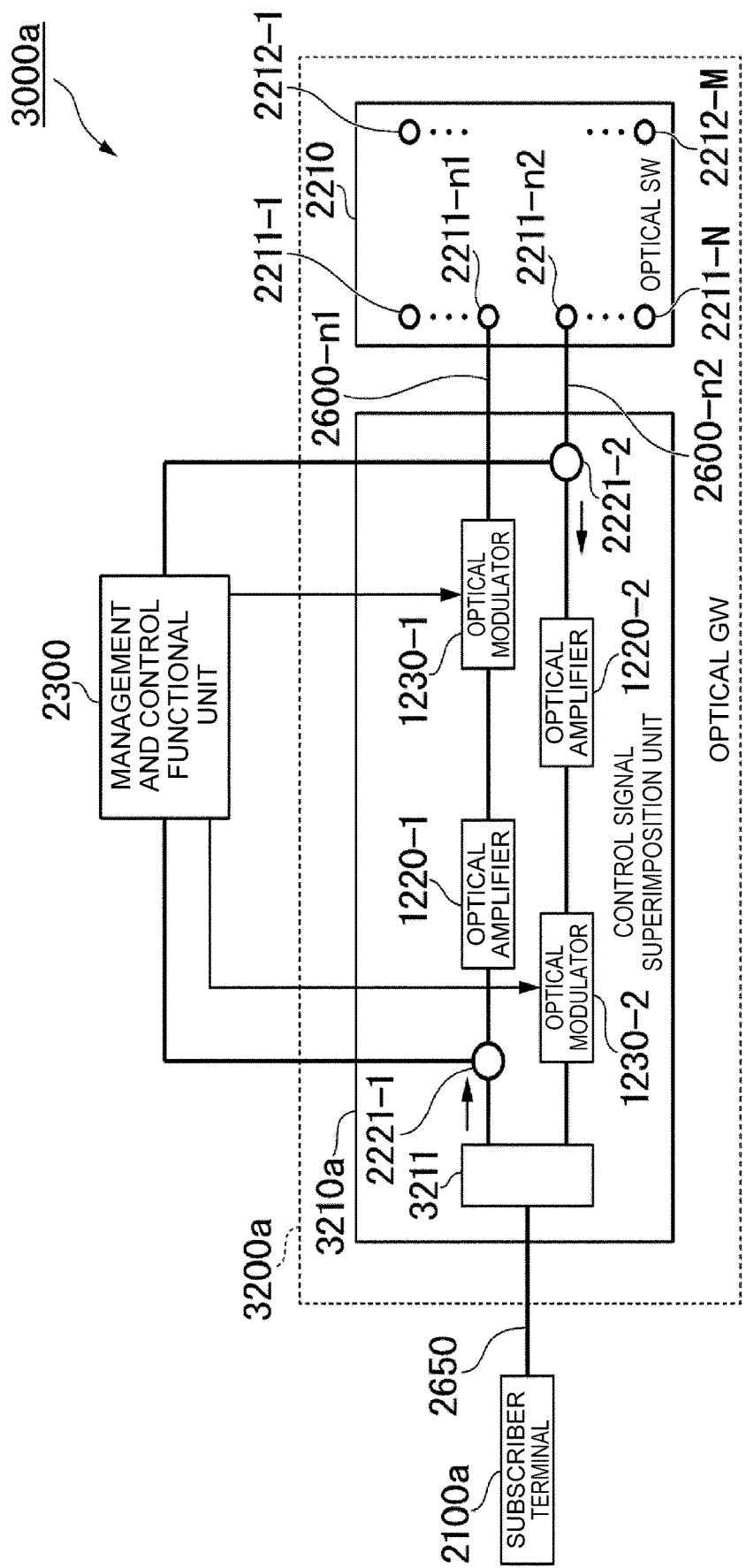
FIG. 9 is a diagram illustrating the configuration of the optical communication system according to the third embodiment.

An optical SW may use different ports for transmission to and for reception from a single unit of subscriber terminal 2100a. FIG. 9 is a diagram illustrating the configuration of an optical communication system 3000a when an optical SW uses different ports for transmission to and for reception from a single unit of subscriber terminal 2100a. The optical communication system 3000a illustrated in FIG. 9 is different from the optical communication system 3000 illustrated in FIG. 8 in that an optical GW 3200a is provided instead of the optical GW 3200, and the subscriber terminal 2100a is connected to the optical transmission path 2650 instead of the optical transmission path 2600. While FIG. 9 only illustrates a single unit of subscriber terminal 2100a, a plurality of units of subscriber terminals 2100a can possibly be connected to the optical GW 3200a.

The optical GW 3200a includes a control signal superimposition unit 3210a and the optical SW 2210. While FIG. 9 illustrates only a single control signal superimposition unit 3210a, the optical GW 3200a can possibly include a plurality of control signal superimposition units 3210a. The control signal superimposition unit 3210a includes a transmission-reception separation device 3211, the splitters 2221-1 and 2221-2, the optical amplifiers 1220-1 and 1220-2, and the optical modulators 1230-1 and 1230-2. The splitter 2221-1, the optical amplifier 1220-1, and the optical modulator 1230-1 are provided on the optical transmission path 2600-n1 between the transmission-reception separation device 3211 and the first port 2211-n1 of the optical SW 2210. The splitter 2221-2, the optical amplifier 1220-2, and the optical modulator 1230-2 are provided on the optical transmission path 2600-n2 between the transmission-reception separation device 3211 and the first port 2211-n2 of the optical SW 2210. The transmission-reception separation device 3211 is connected to the optical transmission path 2650, and to the optical transmission paths 2600-n1 and 2600-n2.

The transmission-reception separation device 3211 receives an input of an optical signal transmitted by the subscriber terminal 2100a from the optical transmission path 2650, and outputs the input optical signal to the optical transmission path 2600-n1. The splitter 2221-1 receives an input of the optical signal output by the transmission-reception separation device 3211, and splits the input optical signal into parts. The splitter 2221-1 outputs a part of the split optical signal to the management and control functional unit 2300, while outputting the remaining part of the split optical signal to the optical amplifier 1220-1. The optical amplifier 1220-1 removes the control signal on the low-frequency side from the input optical signal, and outputs the optical signal to the optical modulator 1230-1. The optical modulator 1230-1 superimposes a control signal, input from the management and control functional unit 2300, on the optical signal input from the optical amplifier 1220-1, and outputs the superimposed signal to the optical transmission path 2600-n1.

The splitter 2221-2 receives an input of an optical signal addressed to the subscriber terminal 2100a from the optical SW 2210, and splits the input optical signal into parts. The splitter 2221-2 outputs a part of the split optical signal to the management and control functional unit 2300, while outputting the remaining part of the split optical signal to the optical amplifier 1220-2. The optical amplifier 1220-2 removes the control signal on the low-frequency side from the input optical signal, and outputs the optical signal to the optical modulator 1230-2. The optical modulator 1230-2 superimposes a control signal, input from the management and control functional unit 2300, on the optical signal input from the optical amplifier 1220-2, and outputs the superimposed signal to the transmission-reception separation device 3211. The transmission-reception separation device 3211 outputs the optical signal input from the optical modulator 1230-2 to the optical transmission path 2650 between the transmission-reception separation device 3211 and the subscriber terminal 2100a.

If the management and control functional unit 2300 does not superimpose a control signal on an optical signal transmitted from the subscriber terminal 2100a, then the control signal superimposition unit 3210a may not be provided with the optical amplifier 1220-1 and the optical modulator 1230-1. If the management and control functional unit 2300 does not superimpose a control signal on an optical signal addressed to the subscriber terminal 2100a, then the control signal superimposition unit 3210a may not be provided with the optical amplifier 1220-2 and the optical modulator 1230-2.

There is a case where the subscriber terminal 2100 as a communication destination for the subscriber terminal 2100a is connected to an optical GW 3200a (described as "optical GW 3200a-2") different from the optical GW 3200a (described as "optical GW 3200a-1") connected to the subscriber terminal 2100a. In that case, the control signal superimposition unit 3210a in the optical GW 3200a-1 may not be provided with the optical amplifier 1220-2 and the optical modulator 1230-2, and simultaneously, the control signal superimposition unit 3210a in the optical GW 3200a-2 may not be provided with the optical amplifier 1220-2 and the optical modulator 1230-2. In this case, the control signal superimposition unit 3210a in the optical GW 3200a-1 superimposes a control signal for the subscriber terminal 2100 as a communication destination on an optical signal to be transmitted from the subscriber terminal 2100a to the subscriber terminal 2100 as the communication destination. In addition, the control signal superimposition unit 3210a in the optical GW 3200a-2 superimposes a control signal for the subscriber terminal 2100a on an optical signal to be transmitted from the subscriber terminal 2100 as the communication destination to the subscriber terminal 2100a.

Alternatively, the control signal superimposition unit 3210a in the optical GW 3200a-1 may not be provided with the optical amplifier 1220-1 and the optical modulator 1230-1, and simultaneously, the control signal superimposition unit 3210a in the optical GW 3200a-2 may not be provided with the optical amplifier 1220-1 and the optical modulator 1230-1. In this case, the control signal superimposition unit 3210a in the optical GW 3200a-2 superimposes a control signal for the subscriber terminal 2100 as the communication destination on an optical signal to be transmitted from the subscriber terminal 2100a to the subscriber terminal 2100 as the communication destination. The control signal superimposition unit 3210a in the optical GW 3200a-1 superimposes a control signal for the subscriber terminal 2100a on an optical signal to be transmitted from the subscriber terminal 2100 as the communication destination to the subscriber terminal 2100a.

According to the present embodiment, the optical communication system includes the control signal superimposition unit 3210 or 3210a, so that even after the subscriber terminal 2100 has completed connection with its desired connection destination, the management and control functional unit 2300 can still transmit a control signal, such as a wavelength management and control signal, to the subscriber terminal 2100. In addition, since each control signal superimposition unit 3210 or 3210a is dedicated for each individual subscriber terminal 2100, the management and control is more simplified compared to the second embodiment.

Fourth Embodiment

In the above embodiments, a control signal superimposed on an optical signal transmitted by a user terminal is eliminated by a filter somewhere along a communication path, and then an additional control signal is superimposed on the optical signal. In the present embodiment, a control signal superimposed on an optical signal transmitted by a user terminal is removed somewhere along a communication path by an inverted control signal, and then an additional control signal is superimposed on the optical signal.

Figure 10:
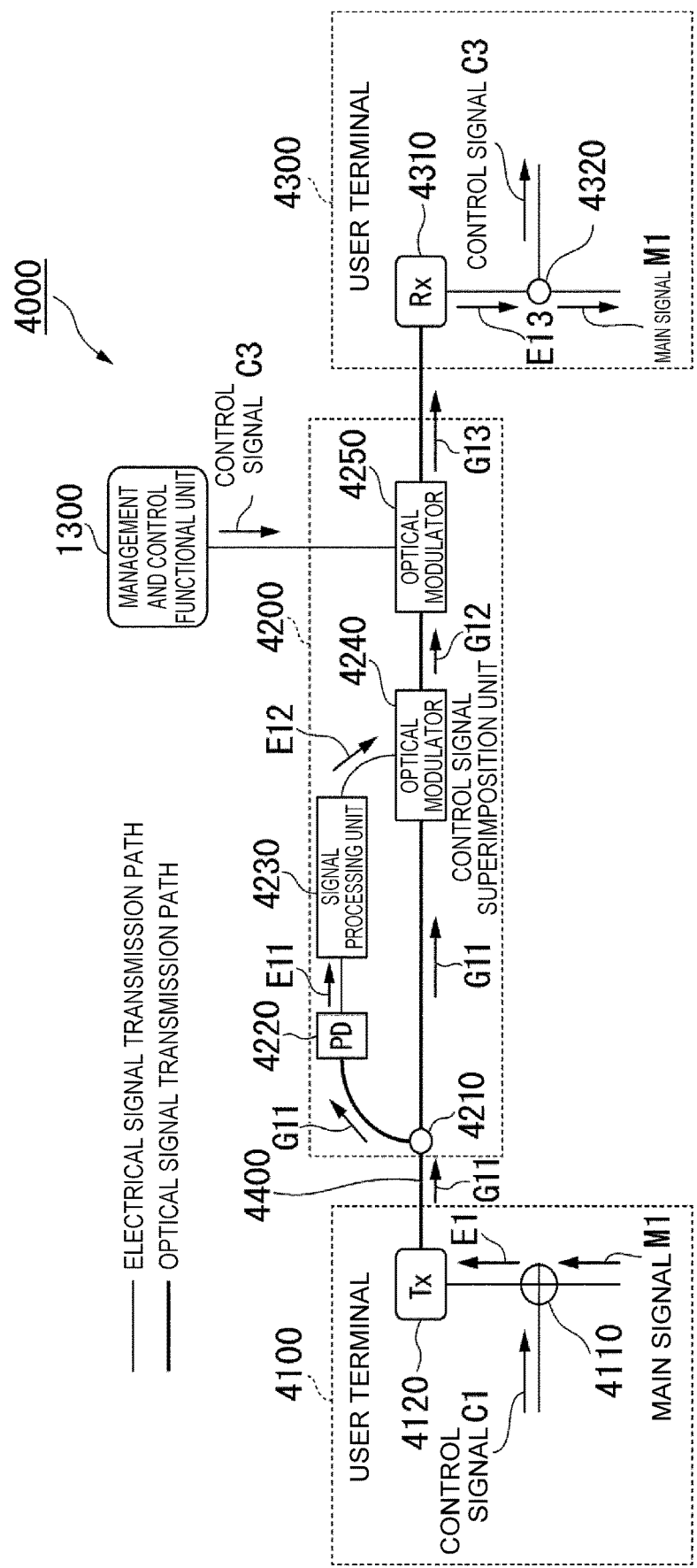
FIG. 10 is a diagram illustrating the configuration of an optical communication system according to a fourth embodiment.

FIG. 10 is a diagram illustrating the configuration of an optical communication system 4000 according to a fourth embodiment. The optical communication system 4000 includes a user terminal 4100, a control signal superimposition unit 4200, the management and control functional unit 1300, and a user terminal 4300. The user terminal 4100 and the user terminal 4300 are connected by an optical fiber 4400. The control signal superimposition unit 4200 is provided on the optical fiber 4400.

As the user terminal 4100, an optical communication apparatus configured to transmit an optical signal according to the conventional technique can be used. The user terminal 4100 includes a signal mixer 4110 and an optical transmitter (Tx) 4120. The signal mixer 4110 outputs the electrical signal E1 to the Tx 4120. In the electrical signal E1, the main signal M1 and the control signal C1 that are electrical signals with different frequencies have been superimposed on one another. The frequency of the control signal C1 is lower than the frequency of the main signal M1. For example, as the control signal C1, the AMCC is used. The Tx 4120 converts the electrical signal E1 to the optical signal G11, and outputs the optical signal G11 to the optical fiber 4400.

The control signal superimposition unit 4200 includes a splitter 4210, a photo diode (PD) 4220, a signal processing unit 4230, an optical modulator 4240, and an optical modulator 4250. The splitter 4210, the optical modulator 4240, and the optical modulator 4250 are provided on the optical fiber 4400.

The splitter 4210 receives an input of the optical signal G11 output by the user terminal 4100 from the optical fiber 4400. The splitter 4210 splits the input optical signal G11 into parts, and outputs a part of the split optical signal G11 to the PD 4220, while outputting the remaining part of the split optical signal G11 to the optical modulator 4240.

The PD 4220 converts the part of the optical signal G11 split by the splitter 4210 to an electrical signal E11, and outputs the converted electrical signal E11 to the signal processing unit 4230.

The signal processing unit 4230 reads the control signal C1 from the electrical signal E11 output by the PD 4220, and generates an inverted signal E12 that is the inverted control signal C1. The inverted signal E12 is a signal with its phase inverted from the original control signal C1. Since the control signal C1 falls within the low frequency range, it is possible for the signal processing unit 4230 to generate the inverted signal E12 without performing costly signal processing. The signal processing unit 4230 outputs the generated inverted signal E12 to the optical modulator 4240.

The optical modulator 4240 is an LN modulator, an EA modulator, an SOA, or the like. The optical modulator 4240 modulates the optical signal G11 input from the splitter 4210 again based on the inverted signal E12 input from the signal processing unit 4230, and removes the control signal C1 from the optical signal G11. The main signal M1 is set in the optical signal G12 with the control signal C1 removed. The optical modulator 4240 outputs the optical signal G12 to the optical modulator 4250.

The optical modulator 4250 superimposes the control signal C3, input from the management and control functional unit 1300, on the low-frequency side of the optical signal G12 to generate an optical signal G13, and outputs the optical signal G13 to the user terminal 4300. As the optical modulator 4250, the optical modulator 1230-1 in the first embodiment illustrated in FIGS. 1 and 2 can be used.

As the user terminal 4300, an optical communication apparatus configured to receive an optical signal according to the conventional technique can be used. The user terminal 4300 includes an optical receiver (Rx) 4310 and a signal divider 4320. The Rx 4310 receives the optical signal G13, output by the control signal superimposition unit 4200, from the optical fiber 4400, converts the received optical signal G13 to an electrical signal E13, and outputs the electrical signal E13. The signal divider 4320 separates the electrical signal E13, output by the Rx 4310, into the main signal M1 and the control signal C3 based on their respective frequencies.

Note that some or all of the functional units in the control signal superimposition unit 4200 may be included in the management and control functional unit 1300. According to the present embodiment, the optical communication system includes the control signal superimposition unit 4200, so that even after connection between the user terminal 4100 and the user terminal 4300 has completed, the management and control functional unit 1300 can still transmit a control signal to the user terminal 4300.

Although not illustrated in FIG. 10, the PD 4220 or the signal processing unit 4230 may be connected to the management and control functional unit 1300. The PD 4220 or the signal processing unit 4230 transmits information in a control signal superimposed in the user terminal 4100 to the management and control functional unit 1300. This allows the management and control functional unit 1300 to monitor information in a control signal transmitted between user terminals.

Note that if the control signal superimposition unit 4200 does not superimpose a control signal, then the control signal superimposition unit 4200 allows a signal transmitted from the user terminal 4100 to directly pass through the transmission path without applying a signal to the optical modulator 4240 and the optical modulator 4250. In this case, an SOA cannot be used in principle.

Fifth Embodiment

In the fourth embodiment, a control signal superimposed on an optical signal transmitted by a user terminal is removed somewhere along a communication path by an inverted control signal, and then an additional control signal is superimposed on the optical signal. In the present embodiment, an optical signal is modulated somewhere along a communication path by using a signal in which an inverted control signal and an additional control signal have been superimposed on one another. The present embodiment is described below, mainly focusing on the differences from the fourth embodiment.

Figure 11:
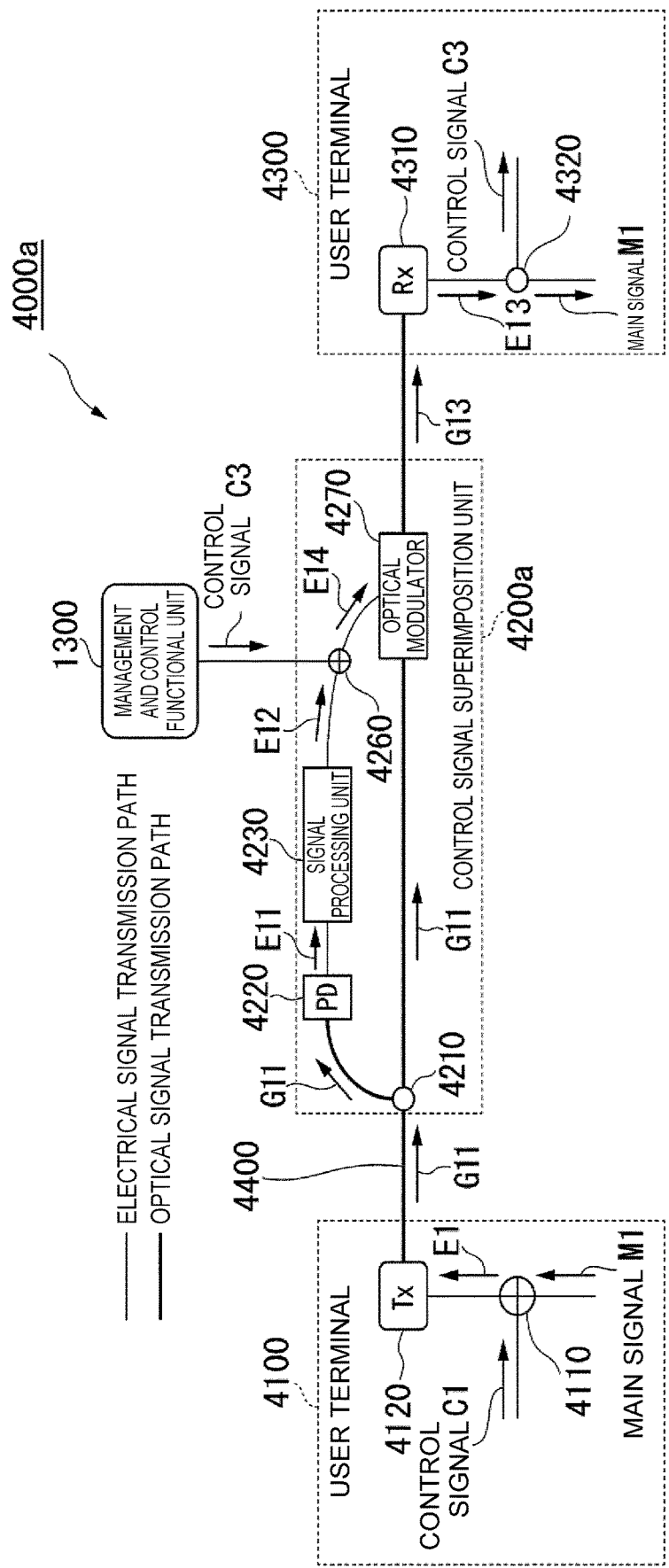
FIG. 11 is a diagram illustrating the configuration of an optical communication system according to a fifth embodiment.

FIG. 11 is a diagram illustrating the configuration of an optical communication system 4000*a* of the present embodiment. The optical communication system 4000*a* illustrated in FIG. 11 is different from the optical communication system 4000 of the fourth embodiment illustrated in FIG. 10 in that a control signal superimposition unit 4200*a* is provided instead of the control signal superimposition unit 4200.

The control signal superimposition unit 4200*a* includes the splitter 4210, the PD 4220, the signal processing unit 4230, a superimposition unit 4260, and an optical modulator 4270. The superimposition unit 4260 outputs a superimposed signal E14 to the optical modulator 4270. The superimposed signal E14 is an electrical signal obtained by superimposing the inverted signal E12 input from the signal processing unit 4230, and the control signal C3 input from the management and control functional unit 1300 on one another. The optical modulator 4270 modulates the optical signal G11 input from the splitter 4210 again based on the superimposed signal E14 input from the superimposition unit 4260, and generates the optical signal G13 with the control signal C1 removed and with the control signal C3 superimposed on the main signal M1. The optical modulator 4270 outputs the generated optical signal G13 to the user terminal 4300.

Note that some or all of the functional units in the control signal superimposition unit 4200*a* may be included in the management and control functional unit 1300. According to the present embodiment, the number of optical modulators to be used in a control signal superimposition unit can be reduced, compared to the fourth embodiment.

In the same manner as in the fourth embodiment, the PD 4220 or the signal processing unit 4230 may be connected to the management and control functional unit 1300. The PD 4220 or the signal processing unit 4230 transmits information in a control signal superimposed in the user terminal 4100 to the management and control functional unit 1300. This allows the management and control functional unit 1300 to monitor information in a control signal transmitted between user terminals. Note that if the control signal superimposition unit 4200*a* does not superimpose a control signal, then the control signal superimposition unit 4200*a* allows a signal transmitted from the user terminal 4100 to directly pass through the transmission path without applying a signal to the optical modulator 4270.

Sixth Embodiment

In the present embodiment, an optical communication system that switches the wavelength to a different wavelength during communication between user terminals uses the control signal superimposition unit of the fifth embodiment or a sixth embodiment to superimpose a control signal somewhere along a communication path. The present embodiment is described below, mainly focusing on the differences from the above embodiments.

Figure 12:
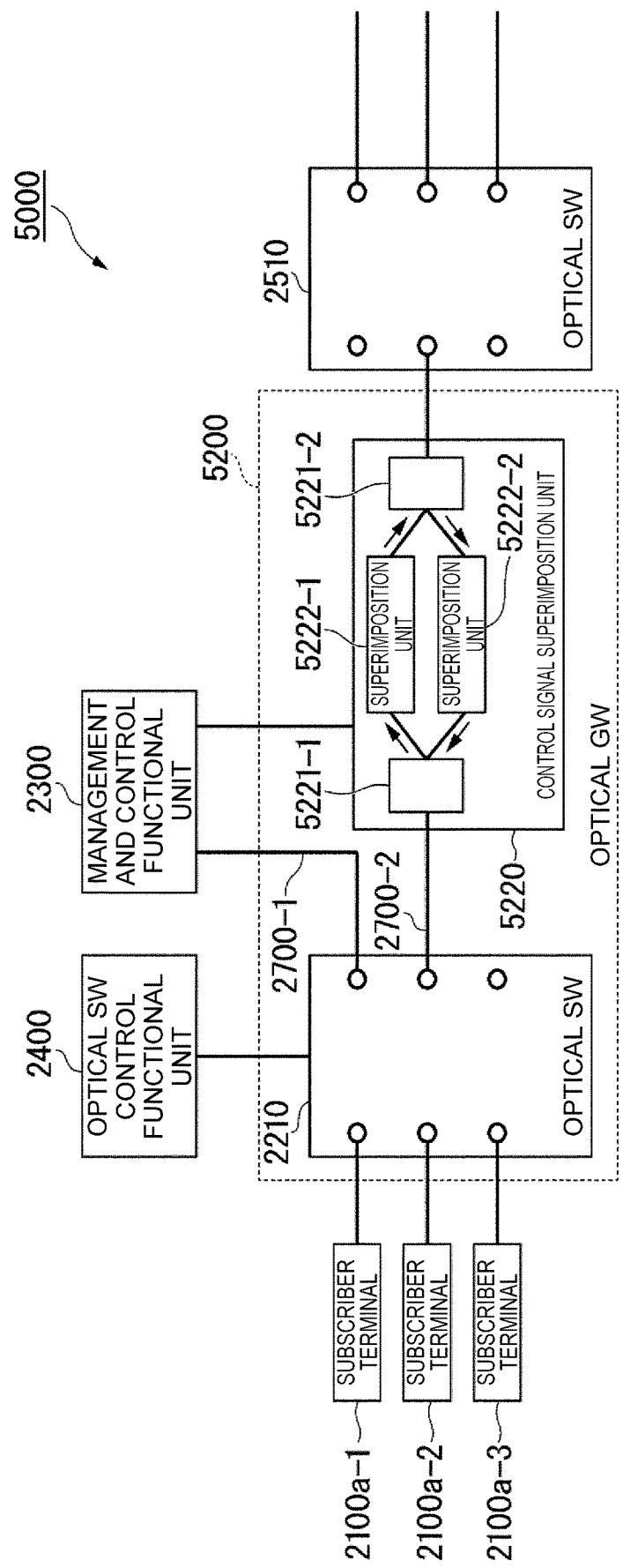
FIG. 12 is a diagram illustrating the configuration of an optical communication system according to a sixth embodiment.

FIG. 12 is a diagram illustrating the configuration of an optical communication system 5000 according to the sixth embodiment. The optical communication system 5000 is different from the optical communication system 2000 of the second embodiment illustrated in FIG. 6 in that an optical GW 5200 is provided instead of the optical GW 2200. The optical GW 5200 is different from the optical GW 2200 illustrated in FIG. 6 in that a control signal superimposition unit 5220 is provided instead of the control signal superimposition unit 2220. In the optical GW 5200, the control signal superimposition unit 5220 is provided on the optical transmission path 2700-$m$ (m is an integer equal to or larger than 2, and equal to or smaller than M), while FIG. 12 illustrates only a single control signal superimposition unit 5220. On some of the optical transmission paths 2700-2 to 2700-M, the control signal superimposition unit 5220 may not be provided.

The control signal superimposition unit 5220 includes transmission-reception separation devices 5221-1 and 5221-2, and superimposition units 5222-1 and 5222-2. The transmission-reception separation device 5221-1 outputs an optical signal, output by the optical SW 2210, to the superimposition unit 5222-1, and outputs an optical signal, output by the superimposition unit 5222-2, to the optical SW 2210. The transmission-reception separation device 5221-2 outputs an optical signal, output by the superimposition unit 5222-1, to an additional optical SW such as the optical SW 2510, and outputs an optical signal, input from an additional optical SW such as the optical SW 2510, to the superimposition unit 5222-2.

The superimposition units 5222-1 and 5222-2 are either the control signal superimposition unit 4200 of the fourth embodiment illustrated in FIG. 10 or the control signal superimposition unit 4200a of the fifth embodiment illustrated in FIG. 11. The superimposition unit 5222-1 removes a control signal set by the subscriber terminal 2100a from an optical signal transmitted by the subscriber terminal 2100a, and superimposes a control signal, output by the management and control functional unit 2300, on the optical signal. In the superimposition unit 5222-1, the splitter 4210 (FIGS. 10 and 11) splits the optical signal input from the transmission-reception separation device 5221-1 into parts, while the optical modulator 4250 (FIG. 10) or the optical modulator 4270 (FIG. 11) outputs the optical signal to the transmission-reception separation device 5221-2. The superimposition unit 5222-2 removes a control signal set by a transmission source of an optical signal addressed to the subscriber terminal 2100a from the optical signal, and superimposes a control signal, output by the management and control functional unit 2300, on the optical signal. In the superimposition unit 5222-2, the splitter 4210 (FIGS. 10 and 11) splits the optical signal input from the transmission-reception separation device 5221-2 into parts, while the optical modulator 4250 (FIG. 10) or the optical modulator 4270 (FIG. 11) outputs the optical signal to the transmission-reception separation device 5221-1.

Figure 13:
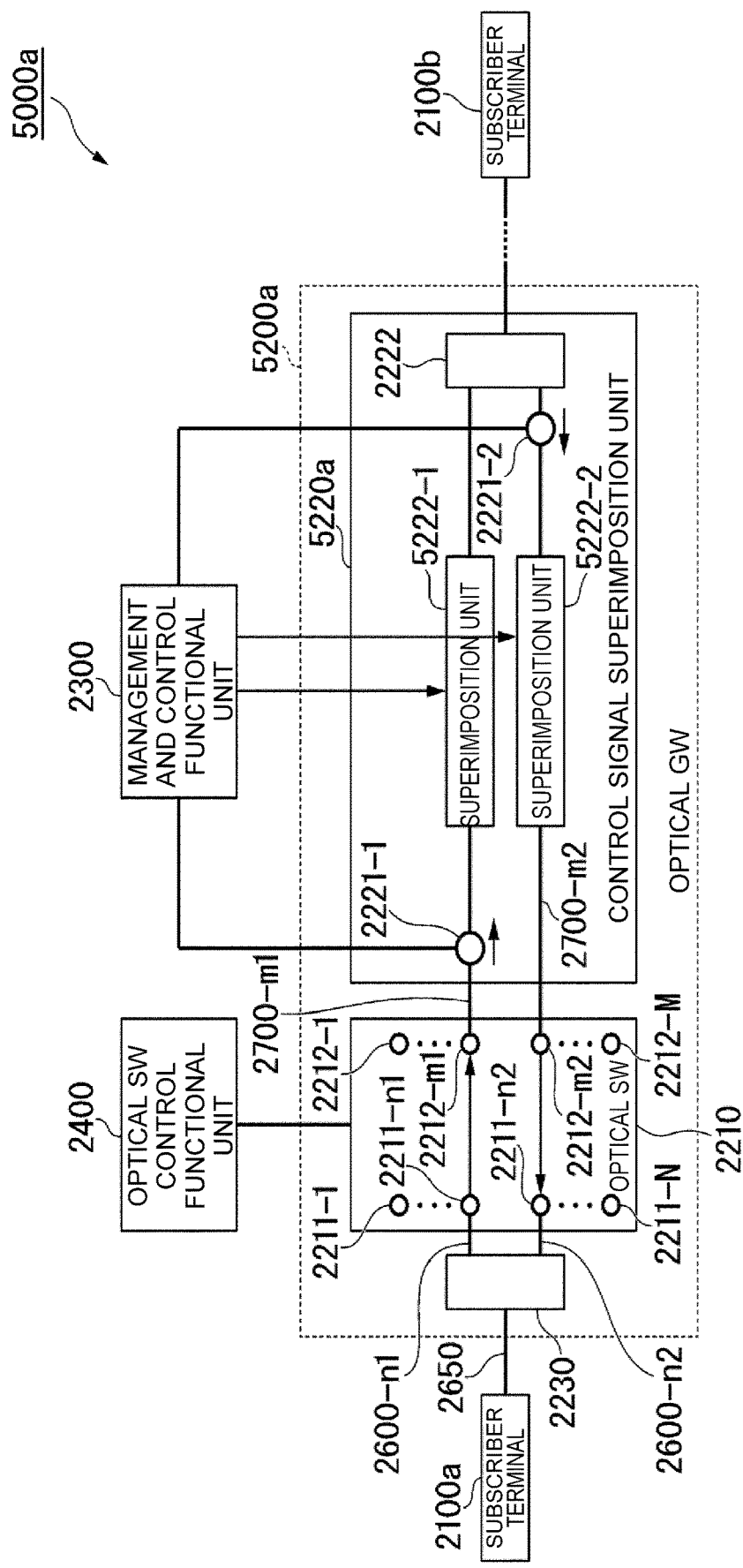
FIG. 13 is a diagram illustrating the configuration of the optical communication system according to the sixth embodiment.

Note that an optical SW may use different ports for transmission to and for reception from a single unit of subscriber terminal 2100a. FIG. 13 is a diagram illustrating the configuration of an optical communication system 5000a when an optical SW uses different ports for transmission to and for reception from a single unit of subscriber terminal 2100a. The optical communication system 5000a illustrated in FIG. 13 is different from the optical communication system 2000a illustrated in FIG. 7 in that an optical GW 5200a is provided instead of the optical GW 2200a. While FIG. 13 only illustrates a single unit of subscriber terminal 2100a, a plurality of units of subscriber terminals 2100a can possibly be connected to the optical GW 5200a.

The optical GW 5200a includes the transmission-reception separation device 2230, the optical SW 2210, and a control signal superimposition unit 5220a. While FIG. 13 illustrates only a single control signal superimposition unit 5220a, the optical GW 5200a can possibly include a plurality of control signal superimposition units 5220a. The control signal superimposition unit 5220a is different from the control signal superimposition unit 2220a illustrated in FIG. 7 in that the superimposition unit 5222-1 is provided instead of the optical amplifier 1220-1 and the optical modulator 1230-1, and the superimposition unit 5222-2 is provided instead of the optical amplifier 1220-2 and the optical modulator 1230-2.

Operation of the optical communication system 5000a is described below. An optical signal transmitted by the subscriber terminal 2100a is output from the second port 2212-$m$1 of the optical SW 2210 in the same manner as the optical communication system 2000a illustrated in FIG. 7. The splitter 2221-1 in the control signal superimposition unit 5220a splits the optical signal, output from the second port 2212-$m$1 by the optical SW 2210, into parts. The splitter 2221-1 outputs a part of the split optical signal to the management and control functional unit 2300, while outputting the remaining part of the split optical signal to the superimposition unit 5222-1. The management and control functional unit 2300 monitors a control signal set in the part of the optical signal split by the splitter 2221-2.

The superimposition unit 5222-1 removes a control signal set by the subscriber terminal 2100a from the optical signal transmitted by the subscriber terminal 2100a, and superimposes an additional control signal, output by the management and control functional unit 2300, on the optical signal. The superimposition unit 5222-1 outputs the optical signal with the control signal removed and with the additional control signal superimposed to the transmission-reception separation device 2222. The transmission-reception separation device 2222 outputs the signal, input from the superimposition unit 5222-1, to an additional optical SW connected to the subscriber terminal 2100b.

The transmission-reception separation device 2222 receives an input of an optical signal, transmitted by the subscriber terminal 2100b and addressed to the subscriber terminal 2100a, from an additional optical SW, and outputs the input optical signal to the optical transmission path 2700-$m$2. The splitter 2221-2 splits the optical signal input from the transmission-reception separation device 2222 into parts. The splitter 2221-2 outputs a part of the split optical signal to the management and control functional unit 2300, while outputting the remaining part of the split optical signal to the superimposition unit 5222-2. The management and control functional unit 2300 monitors a control signal set in the part of the optical signal split by the splitter 2221-2.

The superimposition unit 5222-2 removes a control signal set by a counterpart subscriber terminal 2100b from an optical signal addressed to the subscriber terminal 2100a, and superimposes an additional control signal, output by the management and control functional unit 2300, on the optical signal. The superimposition unit 5222-2 inputs the optical signal with the control signal removed and with the additional control signal superimposed to the second port 2212-$m$2 of the optical SW 2210. The optical SW 2210 outputs the optical signal, input from the second port 2212-$m$2, through the first port 2211-$n$2 corresponding to the subscriber terminal 2100a as a destination of this optical signal. The transmission-reception separation device 2230 outputs the optical signal output from the first port 2211-$n$2 to the optical transmission path 2650.

Note that if the management and control functional unit 2300 does not superimpose a control signal on an optical signal transmitted from the subscriber terminal 2100*a*, then each of the control signal superimposition units 5220 and 5220*a* may not be provided with the superimposition unit 5222-1. If the management and control functional unit 2300 does not superimpose a control signal on an optical signal addressed to the subscriber terminal 2100*a*, then each of the control signal superimposition units 5220 and 5220*a* may not be provided with the superimposition unit 5222-2.

There is a case where the subscriber terminal 2100 as a communication destination for the subscriber terminal 2100*a* is connected to an optical GW 5200 or 5200*a* different from the optical GW 5200 or 5200*a* connected to the subscriber terminal 2100*a*. In that case, the superimposition unit 5222-2 may not be provided in the control signal superimposition unit 5220 or 5220*a* in the optical GW 5200 or 5200*a* to which the subscriber terminal 2100*a* is connected, and simultaneously, the superimposition unit 5222-2 may not be provided in the control signal superimposition unit 5220 or 5220*a* in the optical GW 5200 or 5200*a* to which the subscriber terminal 2100 as a communication destination is connected. In this case, the control signal superimposition unit 5220 or 5220*a* in the optical GW 5200 or 5200*a*, to which the subscriber terminal 2100*a* is connected, superimposes a control signal for the subscriber terminal 2100 as a communication destination on an optical signal to be transmitted from the subscriber terminal 2100*a* to the subscriber terminal 2100 as a communication destination. In addition, the control signal superimposition unit 5220 or 5220*a* in the optical GW 5200 or 5200*a*, to which the subscriber terminal 2100 as a communication destination is connected, superimposes a control signal for the subscriber terminal 2100*a* on an optical signal to be transmitted from the subscriber terminal 2100 as a communication destination to the subscriber terminal 2100*a*.

Likewise, there is a case where the subscriber terminal 2100 as a communication destination for the subscriber terminal 2100*a* is connected to an optical GW 5200 or 5200*a* different from the optical GW 5200 or 5200*a* connected to the subscriber terminal 2100*a*. In that case, the superimposition unit 5222-1 may not be provided in the control signal superimposition unit 5220 or 5220*a* in the optical GW 5200 or 5200*a* to which the subscriber terminal 2100*a* is connected, and simultaneously, the superimposition unit 5222-1 may not be provided in the control signal superimposition unit 5220 or 5220*a* in the optical GW 5200 or 5200*a* to which the subscriber terminal 2100 as a communication destination is connected. In this case, the control signal superimposition unit 5220 or 5220*a* in the optical GW 5200 or 5200*a*, to which the subscriber terminal 2100 as a communication destination is connected, superimposes a control signal for the subscriber terminal 2100 as a communication destination on an optical signal to be transmitted from the subscriber terminal 2100*a* to the subscriber terminal 2100*b*. In addition, the control signal superimposition unit 5220 or 5220*a* in the optical GW 5200 or 5200*a*, to which the subscriber terminal 2100*a* is connected, superimposes a control signal for the subscriber terminal 2100*a* on an optical signal to be transmitted from the subscriber terminal 2100 as a communication destination to the subscriber terminal 2100*a*.

According to the present embodiment, the optical communication system includes the control signal superimposition unit 5220 or 5220*a*, so that even after connection between the subscriber terminals 2100 has completed, the management and control functional unit 2300 can still transmit a control signal, such as a wavelength management and control signal, to the subscriber terminals 2100.

Seventh Embodiment

In the sixth embodiment, a control signal is superimposed at the subsequent stage to an optical SW. In the present embodiment, a control signal is superimposed at the previous stage to an optical SW. The present embodiment is described below, mainly focusing on the differences from the above embodiments.

Figure 14:
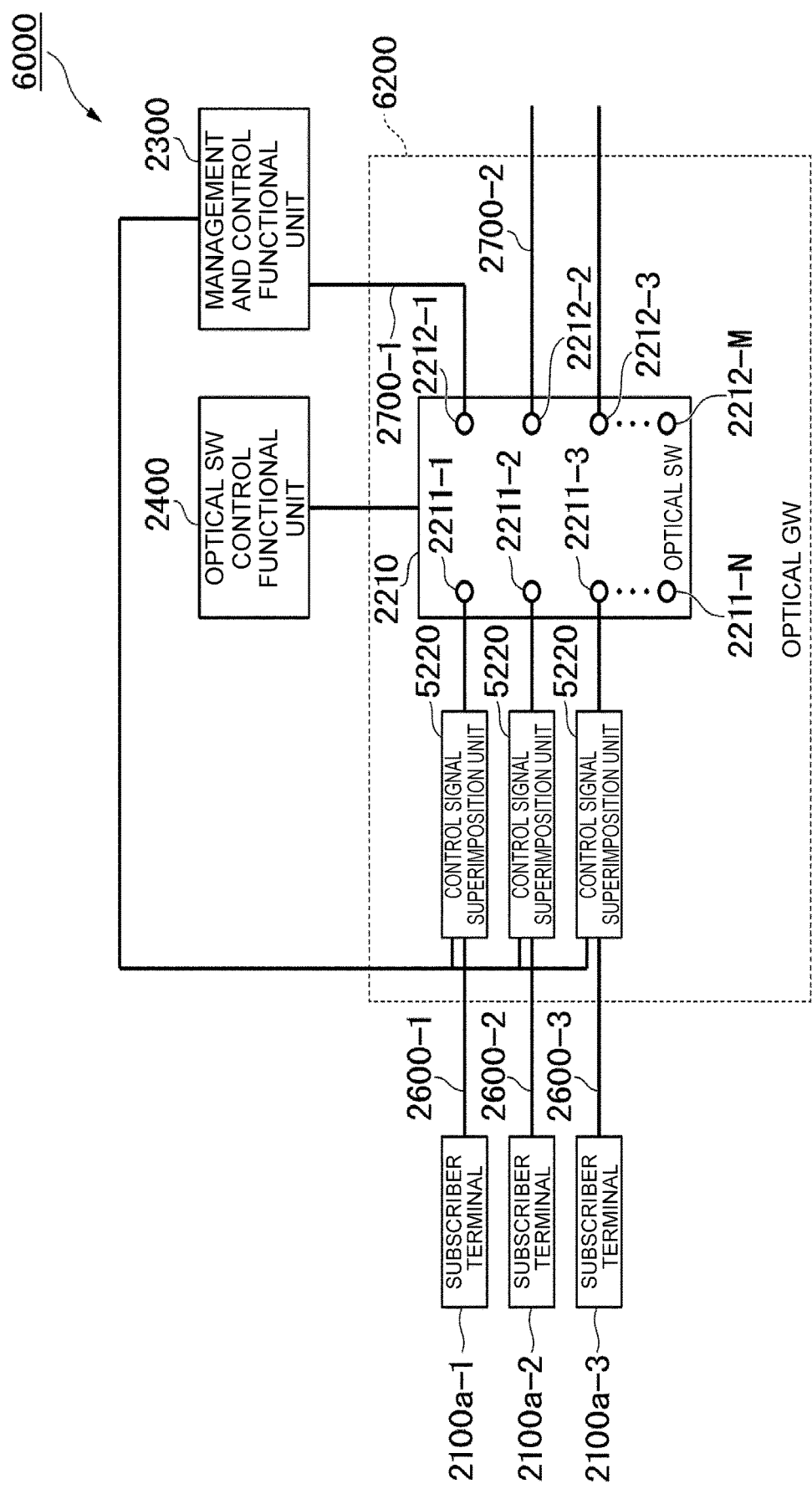
FIG. 14 is a diagram illustrating the configuration of an optical communication system according to a seventh embodiment.

FIG. 14 is a diagram illustrating the configuration of an optical communication system 6000 according to a seventh embodiment. The optical communication system 6000 is different from the optical communication system 3000 of the third embodiment illustrated in FIG. 8 in that an optical GW 6200 is provided instead of the optical GW 3200. The optical GW 6200 is different from the optical GW 3200 illustrated in FIG. 8 in that the control signal superimposition unit 5220 according to the sixth embodiment illustrated in FIG. 12 is provided instead of the control signal superimposition unit 3210.

Note that the management and control functional unit 2300 may transmit a control signal for performing the initial settings on the subscriber terminal 2100*a* through the optical SW 2210 in the same manner as in the third embodiment, or may transmit the control signal superimposed by the control signal superimposition unit 5220. In a case where a control signal is superimposed and transmitted by the control signal superimposition unit 5220, the management and control functional unit 2300 outputs unmodulated light (or modulated light) to the optical SW 2210, and further outputs the control signal to the control signal superimposition unit 5220. The optical SW 2210 outputs the light input from the management and control functional unit 2300 to the optical transmission path 2600. The control signal superimposition unit 5220 superimposes the control signal, input from the management and control functional unit 2300, on the light input from the optical SW 2210, and outputs the optical signal with the control signal superimposed to the subscriber terminal 2100*a*.

Figure 15:
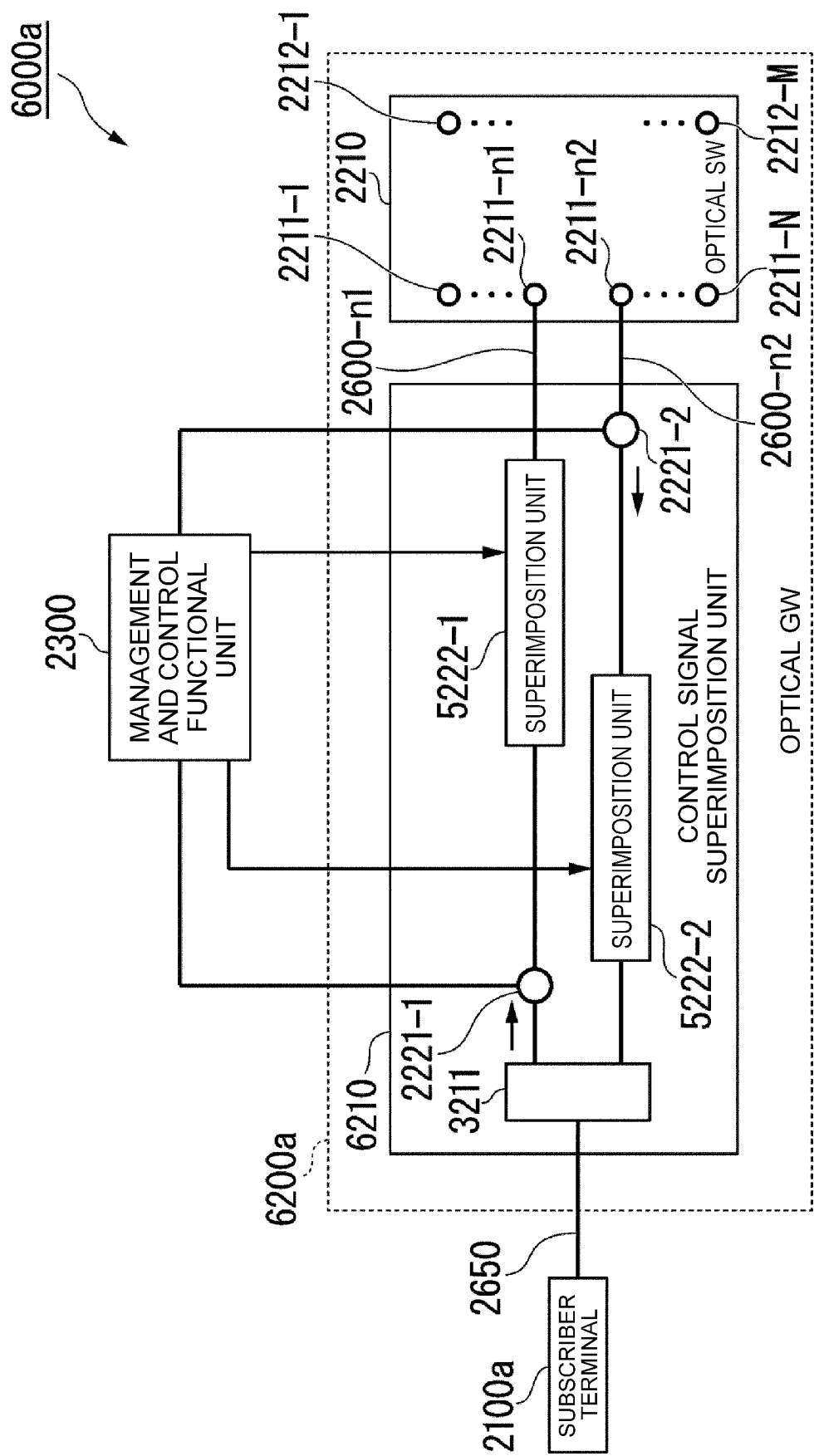
FIG. 15 is a diagram illustrating the configuration of the optical communication system according to the seventh embodiment.

Note that an optical SW may use different ports for transmission to and for reception from a single unit of subscriber terminal 2100*a*. FIG. 15 is a diagram illustrating the configuration of an optical communication system 6000*a* when an optical SW uses different ports for transmission to and for reception from a single unit of subscriber terminal 2100*a*. The optical communication system 6000*a* illustrated in FIG. 15 is different from the optical communication system 3000*a* illustrated in FIG. 9 in that an optical GW 6200*a* is provided instead of the optical GW 3200*a*. While FIG. 15 only illustrates a single unit of subscriber terminal 2100*a*, a plurality of units of subscriber terminals 2100*a* can possibly be connected to the optical GW 6200*a*.

The optical GW 6200*a* includes a control signal superimposition unit 6210 and the optical SW 2210. While FIG. 15 illustrates only a single control signal superimposition unit 6210, the optical GW 6200*a* can possibly include a plurality of control signal superimposition units 6210. The control signal superimposition unit 6210 is different from the control signal superimposition unit 3210*a* illustrated in FIG. 9 in that the superimposition unit 5222-1 is provided instead of the optical amplifier 1220-1 and the optical modulator 1230-1, and the superimposition unit 5222-2 is provided instead of the optical amplifier 1220-2 and the optical modulator 1230-2.

The superimposition unit 5222-1 removes a control signal set by the subscriber terminal 2100a from an optical signal transmitted by the subscriber terminal 2100a, and superimposes a control signal, output by the management and control functional unit 2300, on the optical signal. In the superimposition unit 5222-1, the splitter 4210 (FIGS. 10 and 11) splits an optical signal input from the optical transmission path 2650 into parts, and the optical modulator 4250 (FIG. 10) or the optical modulator 4270 (FIG. 11) outputs the optical signal to the optical SW 2210. The superimposition unit 5222-2 removes a control signal from an optical signal addressed to the subscriber terminal 2100a, and superimposes a control signal, output by the management and control functional unit 2300, on the optical signal. In the superimposition unit 5222-2, the splitter 4210 (FIGS. 10 and 11) splits an optical signal input from the optical SW 2210 into parts, and the optical modulator 4250 (FIG. 10) or the optical modulator 4270 (FIG. 11) outputs the optical signal to the optical transmission path 2650.

According to the present embodiment, even after the subscriber terminal 2100 has completed connection with its desired connection destination, the management and control functional unit 2300 can still transmit a control signal, such as a wavelength management and control signal, to the subscriber terminal 2100. In addition, since each control signal superimposition unit 5220 or 6210 is dedicated for each individual subscriber terminal 2100, the management and control is more simplified compared to the sixth embodiment.

Eighth Embodiment

Figure 16:
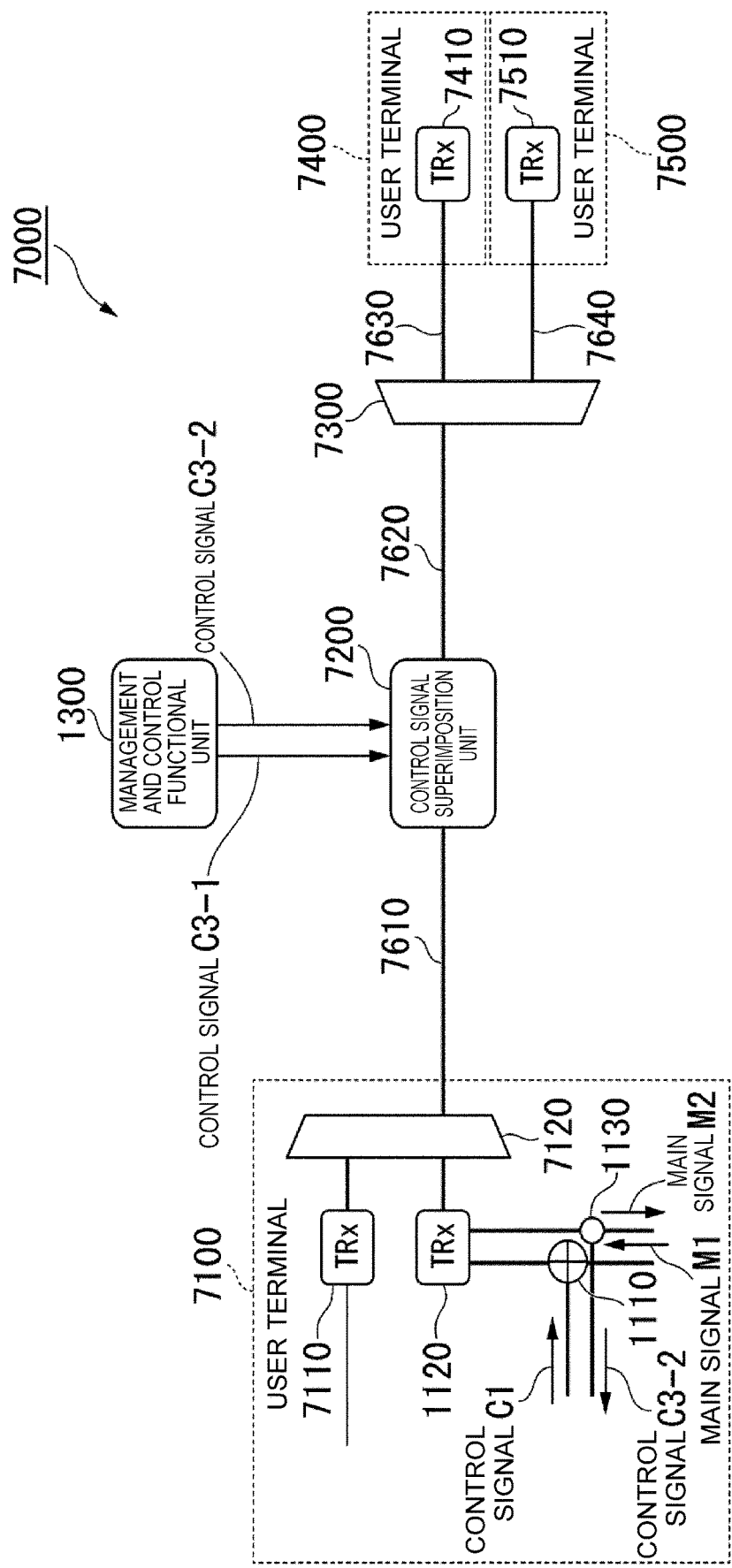
FIG. 16 is a diagram illustrating the configuration of an optical communication system according to an eighth embodiment.

In the present embodiment, a user utilizes multiple services. FIG. 16 is a diagram illustrating the configuration of an optical communication system 7000 according to an eighth embodiment. The optical communication system 7000 includes a user terminal 7100, a control signal superimposition unit 7200, the management and control functional unit 1300, a wavelength division multiplexer 7300, a user terminal 7400, and a user terminal 7500. The user terminal 7100 and the control signal superimposition unit 7200 are connected by an optical fiber 7610. The wavelength division multiplexer 7300 is connected to the control signal superimposition unit 7200 by an optical fiber 7620, connected to the user terminal 7400 by an optical fiber 7630, and connected to the user terminal 7500 by an optical fiber 7640.

The user terminal 7100 utilizes two or more services. An example case is now described in which the user terminal 7100 utilizes a service #1 provided by the user terminal 7400, and a service #2 provided by the user terminal 7500. For example, the user terminal 7400 provides a data communication service, while the user terminal 7500 provides a video-related service of analog signals and other signals. Note that the multiple services to be utilized by the user terminal 7100 are not limited to those described above, but the user terminal 7100 can utilize any service. These services use optical signals with different wavelengths. Any of the multiple services uses a low-frequency control signal.

The user terminal 7100 includes the signal mixer 1110, the TRx 1120, the signal divider 1130, a TRx 7110, and a wavelength division multiplexer 7120. The signal mixer 1110 outputs, to the TRx 1120, a transmission signal for the service #1 in which the main signal M1 and the control signal C1 that are both electrical signals have been superimposed on one another. The TRx 1120 converts the transmission signal from an electrical signal to an optical signal, and outputs the optical signal to the wavelength division multiplexer 7120. The TRx 1120 converts the optical signal for the service #1, input from the wavelength division multiplexer 7120, to an electrical signal, and outputs the electrical signal. The signal divider 1130 separates the electrical signal converted by the TRx 1120 into the main signal and the control signal based on their respective wavelengths. The TRx 7110 converts a transmission signal for the service #2 from an electrical signal to an optical signal, and outputs the optical signal to the wavelength division multiplexer 7120. The TRx 7110 converts the optical signal for the service #2, input from the wavelength division multiplexer 7120, to an electrical signal, and outputs the electrical signal.

The wavelength division multiplexer 7120 multiplexes the optical signal output by the TRx 1120 and the optical signal output by the TRx 7110 together, and outputs the multiplexed optical signal to the optical fiber 7610. The wavelength division multiplexer 7120 receives an input of the optical signal transmitted through the optical fiber 7610, and divides the input optical signal into an optical signal for the service #1 and an optical signal for the service #2 based on their respective wavelengths. The wavelength division multiplexer 7120 outputs the optical signal for the service #1 to the TRx 1120, while outputting the optical signal for the service #2 to the TRx 7110.

The control signal superimposition unit 7200 is either the control signal superimposition unit 1200 of the first embodiment illustrated in FIGS. 1 and 2, the control signal superimposition unit 1200a of the first embodiment illustrated in FIG. 3, the control signal superimposition unit 1200b of the first embodiment illustrated in FIG. 4, the control signal superimposition unit 4200 of the fourth embodiment illustrated in FIG. 10, the control signal superimposition unit 4200a of the fifth embodiment illustrated in FIG. 11, or the control signal superimposition unit 5220 of the sixth embodiment illustrated in FIG. 12.

The wavelength division multiplexer 7300 receives an input of an optical signal transmitted through the optical fiber 7620, and divides the input optical signal into an optical signal for the service #1 and an optical signal for the service #2 based on their respective wavelengths. The wavelength division multiplexer 7300 outputs the optical signal for the service #1 to the optical fiber 7630, while outputting the optical signal for the service #2 to the optical fiber 7640. The wavelength division multiplexer 7120 multiplexes the optical signal for the service #1 transmitted through the optical fiber 7630, and the optical signal for the service #2 transmitted through the optical fiber 7640 together, and outputs the multiplexed optical signal to the optical fiber 7620.

The user terminal 7400 includes a TRx 7410. The TRx 7410 converts the optical signal for the service #1 transmitted through the optical fiber 7630 to an electrical signal, and converts the electrical signal for the service #1 to an optical signal to output the optical signal to the optical fiber 7630. As the user terminal 7400, for example, the user terminal 1100 may be used.

The user terminal 7500 includes a TRx 7510. The TRx 7510 converts the optical signal for the service #2 transmitted through the optical fiber 7640 to an electrical signal, and converts the electrical signal for the service #2 to an optical signal to output the optical signal to the optical fiber 7640.

Operation of the optical communication system 7000 is described below. The user terminal 7100 outputs an optical signal obtained by multiplexing an optical signal for the service #1 and an optical signal for the service #2 together. In the optical signal for the service #1, the main signal M1 and the control signal C1 that are both electrical signals have been superimposed on one another. The control signal superimposition unit 7200 removes the control signal C1 for the service #1 from the optical signal transmitted by the user terminal 7100, and superimposes the control signal C3-1, output by the management and control functional unit 1300, on the optical signal to output the superimposed optical signal to the optical fiber 7620.

The wavelength division multiplexer 7300 divides the optical signal output by the control signal superimposition unit 7200 into an optical signal for the service #1 and an optical signal for the service #2 based on their respective wavelengths. The wavelength division multiplexer 7300 outputs the optical signal for the service #1 to the optical fiber 7630, while outputting the optical signal for the service #2 to the optical fiber 7640. The TRx 7410 in the user terminal 7400 receives the optical signal for the service #1 to convert the optical signal to an electrical signal, and separates the electrical signal into the main signal M1 and the control signal C3-1. The TRx 7510 in the user terminal 7500 converts an electrical signal for the service #2 to an optical signal.

The TRx 7410 in the user terminal 7400 converts the electrical signal for the service #1 to an optical signal, and outputs the converted optical signal. The TRx 7410 may convert an electrical signal, in which the main signal M2 and the control signal C2 have been superimposed on one another, to an optical signal. The TRx 7510 in the user terminal 7500 converts the electrical signal for the service #2 to an optical signal, and outputs the converted optical signal. The wavelength division multiplexer 7300 multiplexes the optical signal for the service #1 output by the user terminal 7400, and the optical signal for the service #2 output by the user terminal 7500 together, and outputs the multiplexed optical signal to the optical fiber 7620.

The control signal superimposition unit 7200 removes the control signal C2 for the service #1 from the optical signal output by the wavelength division multiplexer 7300, and superimposes the control signal C3-2, output by the management and control functional unit 1300, on the optical signal to output the superimposed optical signal to the optical fiber 7610. The wavelength division multiplexer 7120 in the user terminal 7100 receives an input of the optical signal output by the control signal superimposition unit 7200, and divides the input optical signal into an optical signal for the service #1 and an optical signal for the service #2 based on their respective wavelengths. The TRx 1120 receives the optical signal for the service #1 to convert the optical signal to an electrical signal. The signal divider 1130 separates the electrical signal converted by the TRx 1120 into the main signal M2 and the control signal C3-2. The TRx 7110 converts an electrical signal for the service #2 to an optical signal.

Ninth Embodiment

In the eighth embodiment, optical signals for multiple services are multiplexed into an optical signal to be input to the control signal superimposition unit. In the present embodiment, an optical signal for a control-signal rewriting service, which is one of the multiple services to be utilized by a user, is input to the control signal superimposition unit. In the present embodiment, the differences from the eighth embodiment are mainly described below.

Figure 17:
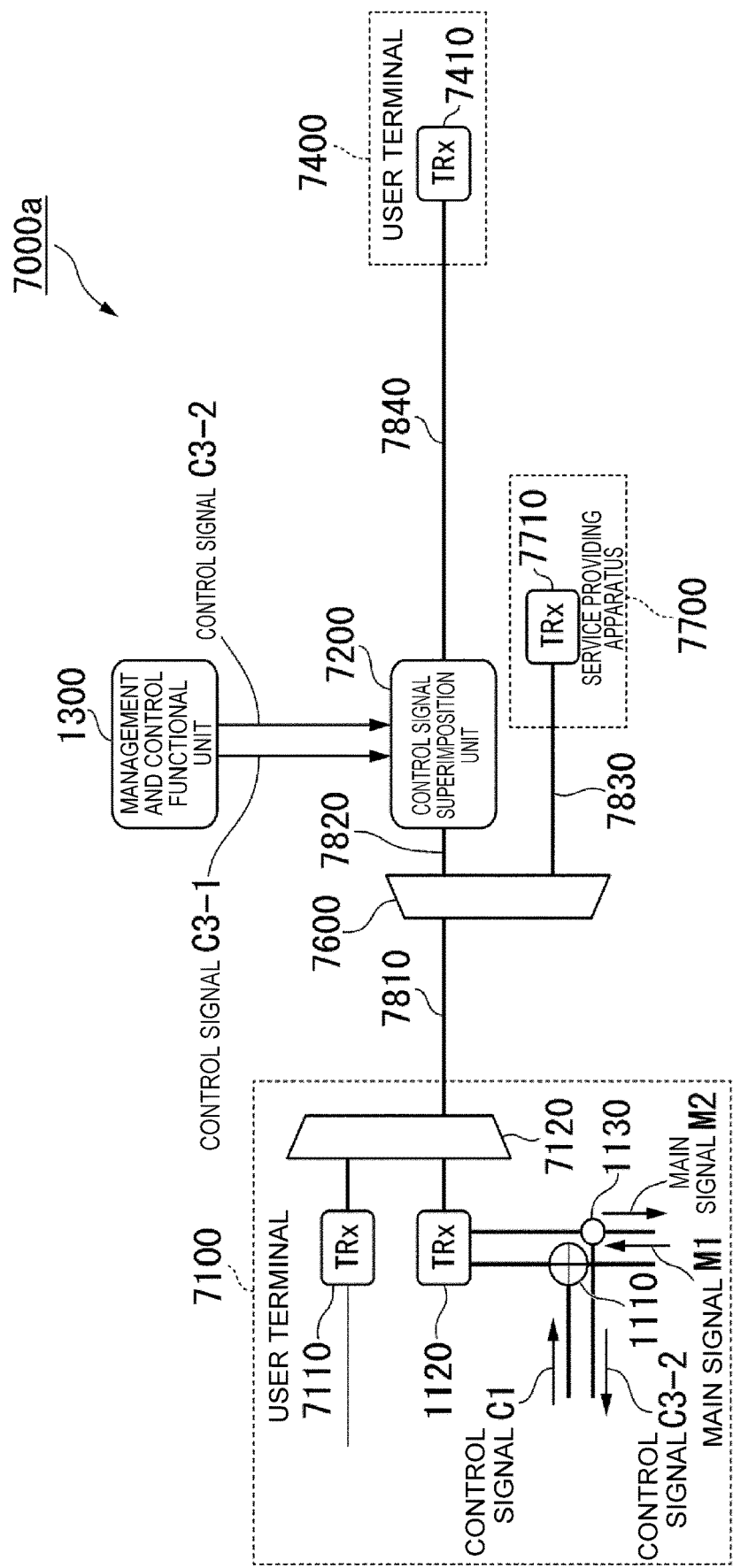
FIG. 17 is a diagram illustrating the configuration of an optical communication system according to a ninth embodiment.
Figure 18:
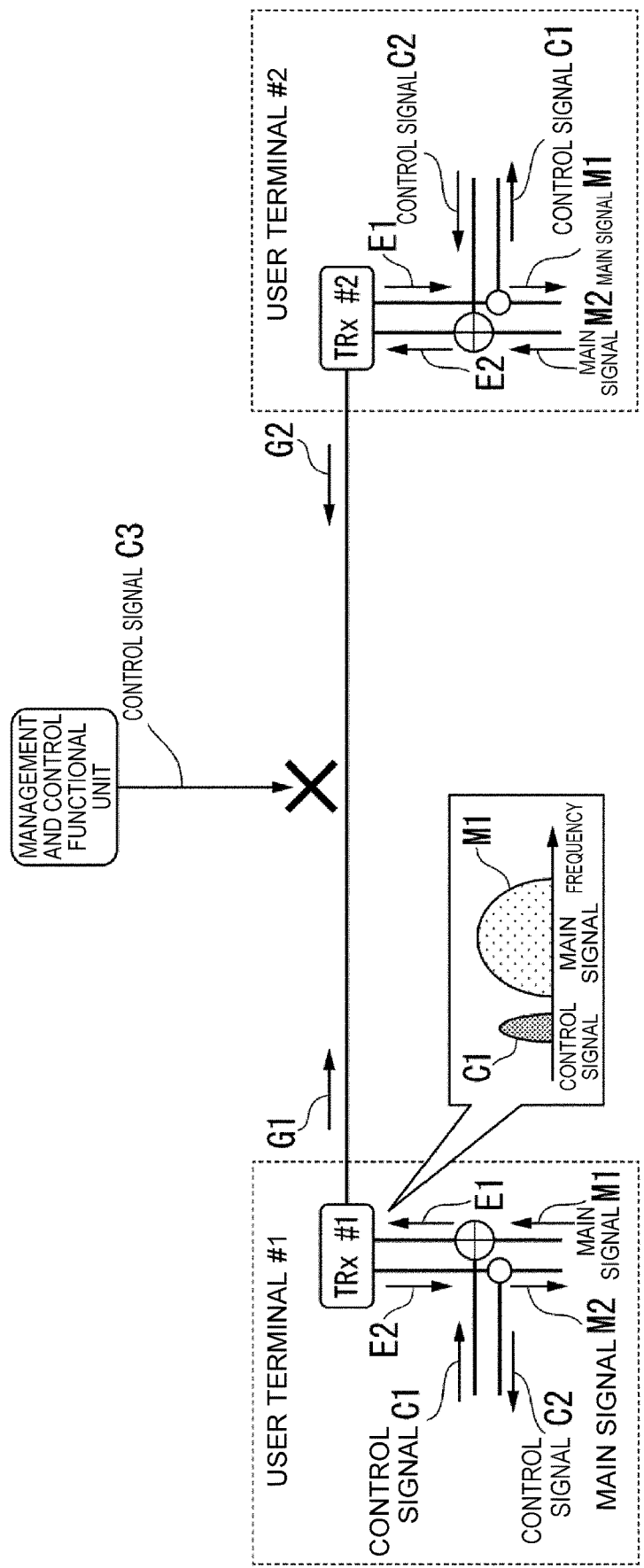
FIG. 18 is a diagram illustrating a configuration example of a conventional optical communication system.

FIG. 17 is a diagram illustrating the configuration of an optical communication system 7000a according to a ninth embodiment. The optical communication system 7000a includes the user terminal 7100, a wavelength division multiplexer 7600, the control signal superimposition unit 7200, the user terminal 7400, and a service providing apparatus 7700. The wavelength division multiplexer 7600 is connected to the user terminal 7100 by an optical fiber 7810, connected to the control signal superimposition unit 7200 by an optical fiber 7820, and connected to the service providing apparatus 7700 by an optical fiber 7830. The user terminal 7400 is connected to the control signal superimposition unit 7200 by an optical fiber 7840.

The wavelength division multiplexer 7600 receives an input of an optical signal transmitted through the optical fiber 7810, and divides the input optical signal into an optical signal for the service #1 and an optical signal for the service #2 based on their respective wavelengths. The wavelength division multiplexer 7600 outputs the optical signal for the service #1 to the optical fiber 7820, while outputting the optical signal for the service #2 to the optical fiber 7830. The wavelength division multiplexer 7600 multiplexes the optical signal for the service #1 transmitted through the optical fiber 7820, and the optical signal for the service #2 transmitted through the optical fiber 7830 together, and outputs the multiplexed optical signal to the optical fiber 7810.

The service providing apparatus 7700 provides the service #2. The service providing apparatus 7700 may be installed on the network such as in a communications station in the same manner as the control signal superimposition unit 7200. The service providing apparatus 7700 includes a TRx 7710. The TRx 7710 converts the optical signal for the service #2 transmitted through the optical fiber 7830 to an electrical signal, and converts the electrical signal for the service #2 to an optical signal to output the optical signal to the optical fiber 7830.

Operation of the optical communication system 7000a is described below. In the same manner as in the eighth embodiment, the user terminal 7100 outputs an optical signal obtained by multiplexing an optical signal for the service #1 and an optical signal for the service #2 together. In the optical signal for the service #1, the main signal M1 and the control signal C1 that are both electrical signals have been superimposed on one another. The wavelength division multiplexer 7600 divides the optical signal output by the user terminal 7100 into an optical signal for the service #1 and an optical signal for the service #2 based on their respective wavelengths. The wavelength division multiplexer 7600 outputs the optical signal for the service #1 to the optical fiber 7820, while outputting the optical signal for the service #2 to the optical fiber 7830. The TRx 7710 in the service providing apparatus 7700 converts an electrical signal for the service #2 to an optical signal. The control signal superimposition unit 7200 removes the control signal C1 from the optical signal for the service #1 divided by the wavelength division multiplexer 7600, and superimposes the control signal C3-1, output by the management and control functional unit 1300, on the optical signal to output the superimposed optical signal to the optical fiber 7840. The TRx 7410 in the user terminal 7400 receives the optical signal for the service #1 to convert the optical signal to an electrical signal, and separates the electrical signal into the main signal M1 and the control signal C3-1.

The TRx 7410 in the user terminal 7400 converts the electrical signal for the service #1 to an optical signal, and outputs the converted optical signal. The TRx 7410 may convert an electrical signal, in which the main signal M2 and the control signal C2 have been superimposed on one another, to an optical signal. The control signal superimposition unit 7200 removes the control signal C2 for the service #1 from the optical signal output by the user terminal 7400, and superimposes the control signal C3-2, output by the management and control functional unit 1300, on the optical signal to output the superimposed optical signal to the optical fiber 7820.

In contrast, the TRx 7710 in the service providing apparatus 7700 converts the electrical signal for the service #2 to an optical signal, and outputs the optical signal. The wavelength division multiplexer 7600 multiplexes the optical signal for the service #1 output by the control signal superimposition unit 7200, and the optical signal for the service #2 output by the service providing apparatus 7700 together, and outputs the multiplexed optical signal to the optical fiber 7810. The user terminal 7100 receives an input of the optical signal output by the wavelength division multiplexer 7600 to perform the same processing as in the eighth embodiment.

Note that each of the control signal superimposition units 1200, 1200a, 1200b, 2220, 2220a, 3210, 3210a, 4200, 4200a, 5220, 5220a, 6210, and 7200 may be provided physically in a single unit of signal control apparatus, or may be virtually a single unit of signal control apparatus made up of physically distributed functional units.

A user terminal configured to perform optical communication according to the conventional technique superimposes a main signal and a control signal on one another in the form of an electrical signal, converts the superimposed electrical signal to an optical signal, and then transmits the optical signal. Due to this operation, the user terminal cannot extract only a control signal from the optical signal, cannot add another control signal, or cannot rewrite the control signal somewhere along a communication path. In order to change the optical wavelength to be used by a user terminal, it is necessary to make a change to the settings of the optical wavelength directly on the user terminal. This makes it difficult for telecommunications carriers and other providers who provide communication services to flexibly change the wavelength through the network. According to the embodiments described above, a control signal provided to a user terminal is removed from an optical signal somewhere along a communication path of the optical signal, and then another control signal is superimposed on the optical signal. In the manner as described above, it is possible to replace a portion of the signal superimposed on the optical signal with a different signal somewhere along the communication path. Thus, this makes it possible for telecommunications carriers and other providers to flexibly transmit a control signal that instructs a user terminal to make a change to the settings, and to allow the user terminal to change the wavelength and other settings.

According to the embodiments described above, an optical signal processing apparatus includes a removal unit and a superimposition unit. The removal unit receives, from a first optical transmission path, an optical signal converted from an electrical signal, in which a first signal and a second signal having different frequencies from each other have been superimposed, and removes the second signal from the optical signal which has been input. The superimposition unit superimposes a third signal having a frequency different from a frequency of the first signal in an electricity field on the optical signal in which the second signal removed by the removal unit, and outputs the optical signal in which the third signal has been superimposed to a second optical transmission path. For example, the superimposition unit is either of the optical modulators 1230-1, 1230-2, 4250, and 4270 described in the above embodiments.

As the removal unit, an amplifier having lower response characteristics to a frequency of the second signal than response characteristics to a frequency of the first signal can be used. For example, the removal unit is either of the optical amplifiers 1220-1 and 1220-2 described in the above embodiments.

The removal unit may read the second signal from the optical signal which has been input from the first optical transmission path, modulate the optical signal by using an inverted signal obtained by inverting the second signal which has been read, and remove the second signal from the optical signal. For example, the removal unit is the PD 4220, the signal processing unit 4230, and the optical modulator 4240 described in the above embodiments.

The removal unit may read the second signal from the optical signal which has been input from the first optical transmission path, and generate an inverted signal by inverting the second signal which has been read. The superimposition unit modulates the optical signal which has been input from the first optical transmission path by using a signal, in which the inverted signal and the third signal have been superimposed, so as to remove the second signal from the optical signal and to superimpose the third signal on the optical signal. For example, the removal unit is the PD 4220 and the signal processing unit 4230 described in the above embodiments, while the superimposition unit is the superimposition unit 4260 and the optical modulator 4270.

Each of the second signal and the third signal may have a frequency lower than or higher than a frequency of the first signal. The first signal may be a main signal, while the second signal and the third signal may be control signals.

The embodiments of the present invention have been described in detail with reference to the drawings. However, the specific configuration is not limited to these embodiments, but may also cover the design and the like without departing from the scope of the present invention.

REFERENCE SIGNS LIST

1000, 2000, 2000a, 3000, 3000a, 4000, 4000a, 5000, 5000a, 6000, 6000a, 7000, 7000a Optical communication system

1100-1, 1100-2, 4100, 4300, 7100, 7400, 7500 User terminal

1110, 1110-1, 1110-2, 4110 Signal mixer

1120, 1120-1, 1120-2, 7110, 7410, 7510, 7710 Optical transceiver

1130, 1130-1, 1130-2, 4320 Signal divider

1200, 1200a, 1200b, 2220, 2220a, 3210, 3210a, 4200, 4200a, 5220, 5220a, 6210, 7200 Control signal superimposition unit

1210-1, 1210-2, 1210a-1, 1210a-2, 2222, 2230, 3211, 5221-1, 5221-2, 6222-2 Transmission-reception separation device

1220-1, 1220-2 Optical amplifier

1230-1, 1230-2, 4240, 4250, 4270 Optical modulator

1240-1, 1240-2, 1260-1, 1260-2, 1270-1, 1270-2, 1280-1, 1280-2, 1295-1, 1295-2, 1500-1, 1500-2, 4400, 7610, 7620, 7630, 7640, 7810, 7820, 7830, 7840 Optical fiber

1250-1, 1250-2, 1290-1, 1290-2, 2210, 2510 Optical switch

1300, 2300 Management and control functional unit

2100a, 2100a-1 to 2100a-3, 2100b Subscriber terminal

2200, 2200a, 2500, 3200, 3200a, 5200, 5200a, 6200, 6200a Optical gateway

2211-1 to 2211-N, 2211-n1, 2211-n2, 2511 First port

2212-1 to 2212-M, 2212-m1, 2212-m2, 2512 Second port 2221-1, 2221-2 Splitter
2400 Optical SW control functional unit
2600-n1, 2600-n2, 2650, 2700-1 to 2700-3, 2700-m1, 2700-m2 Optical transmission path
4120 Optical transmitter
4210 Splitter
4230 Signal processing unit
4260, 5222-1, 5222-2 Superimposition unit
4310 Optical receiver
7120, 7300, 7600 Wavelength division multiplexer
7700 Service providing apparatus

The invention claimed is:

1. An optical communication system comprising:
a controller that controls a subscriber terminal;
an optical switch that is connected to the subscriber terminal, the controller and a communication destination of the subscriber terminal through different optical transmission paths; and
an optical signal processing apparatus that is provided between the communication destination and the optical switch,
wherein the controller is performs:
transmitting, to the subscriber terminal, a first control signal through the optical switch;
instructing, to the optical switch, after transmitting the first control signal so as to switch an output destination of an optical signal received from an optical transmission path connected to the subscriber terminal from an optical transmission path connected to the controller to an optical transmission path to an optical transmission path connected to the communication destination; and
outputting, to the optical signal processing apparatus, a second control signal addressed to the subscriber terminal,
wherein the optical signal processing apparatus comprises:
a remover that receives, from a first optical transmission path, an optical signal, addressed to the subscriber terminal from the communication destination, converted from an electrical signal, in which a first signal and a second signal having different frequencies from each other have been superimposed, and removes the second signal from the optical signal which has been input; and
a superimposer that superimposes a third signal, that is the second control signal, having a frequency different from a frequency of the first signal on the optical signal in which the second signal has been removed by the remover, and outputs the optical signal in which the third signal has been superimposed to a second optical transmission path that is the optical transmission path between the optical signal processing apparatus and the optical switch, and
wherein the optical switch outputs, to the optical transmission path between the optical signal processing apparatus and the subscriber terminal, the optical signal in which the third signal has been superimposed.

2. An optical signal processing method of an optical communication system that comprises:
a controller that controls a subscriber terminal;
an optical switch that is connected to the subscriber terminal, the controller and a communication destination of the subscriber terminal through different optical transmission paths; and
an optical signal processing apparatus that is provided between the communication destination and the optical switch,
the optical signal processing method comprising:
transmitting, by the controller, to the subscriber terminal, a first control signal through the optical switch;
instructing, by the controller, to the optical switch, after transmitting the first control signal so as to switch an output destination of an optical signal received from an optical transmission path connected to the subscriber terminal from an optical transmission path connected to the controller to an optical transmission path to an optical transmission path connected to the communication destination;
outputting, by the controller, to the optical signal processing apparatus, a second control signal addressed to the subscriber terminal;
receiving, by the optical signal processing apparatus, from a first optical transmission path, an optical signal, addressed to the subscriber terminal from the communication destination, converted from an electrical signal, in which a first signal and a second signal having different frequencies from each other have been superimposed, and removing the second signal from the optical signal which has been input;
superimposing, by the optical signal processing apparatus, a third signal, that is the second control signal, having a frequency different from a frequency of the first signal on the optical signal in which the second signal has been removed, and outputting the optical signal in which the third signal has been superimposed to a second optical transmission path that is the optical transmission path between the optical signal processing apparatus and the optical switch; and
outputting, by the optical switch, to the optical transmission path between the optical signal processing apparatus and the subscriber terminal, the optical signal in which the third signal has been superimposed.

3. An optical signal processing apparatus comprising:
a remover that receives, from a first optical transmission path, an optical signal converted from an electrical signal, in which a first signal and a second signal having different frequencies from each other have been superimposed, and removes the second signal from the optical signal which has been input; and
a superimposer that superimposes a third signal having a frequency different from a frequency of the first signal on the optical signal in which the second signal has been removed by the remover, and outputs the optical signal in which the third signal has been superimposed to a second optical transmission path,
wherein the remover is an amplifier having lower response characteristics to a frequency of the second signal than response characteristics to a frequency of the first signal.

4. The optical signal processing apparatus according to claim 3, wherein the remover reads the second signal from the optical signal which has been input from the first optical transmission path, modulates the optical signal by using an inverted signal obtained by inverting the second signal which has been read, and removes the second signal from the optical signal.

5. The optical signal processing apparatus according to claim 3, wherein
the remover reads the second signal from the optical signal which has been input from the first optical transmission path, and generates an inverted signal by inverting the second signal which has been read, and
the superimposer modulates the optical signal which has been input from the first optical transmission path by using a signal, in which the inverted signal and the third signal have been superimposed, so as to remove the second signal from the optical signal and to superimpose the third signal on the optical signal.

6. The optical signal processing apparatus according to claim 3, wherein each of the second signal and the third signal has a frequency lower than or higher than a frequency of the first signal.

7. The optical signal processing apparatus according to claim 3, wherein the first signal is a main signal, and
the second signal and the third signal are control signals.

* * * * *